(12) United States Patent
Yamashita et al.

(10) Patent No.: US 6,466,869 B2
(45) Date of Patent: Oct. 15, 2002

(54) NAVIGATION APPARATUS

(75) Inventors: Atsushi Yamashita, Osaka (JP);
Yoshiki Ueyama, Sakai (JP); Kiyomi Sakamoto, Ikoma (JP); Takeshi Yagyu, Yokohama (JP); Hiroyuki Hamada, Yawata (JP); Teruaki Ata, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/984,230

(22) Filed: Oct. 29, 2001

(65) Prior Publication Data

US 2002/0052689 A1 May 2, 2002

(30) Foreign Application Priority Data

Oct. 31, 2000 (JP) ........................................ 2000-333783
Dec. 11, 2000 (JP) ........................................ 2000-376202

(51) Int. Cl.[7] .............................................. G01C 21/30
(52) U.S. Cl. .......................... 701/211; 701/209; 701/24
(58) Field of Search ................................. 701/211, 208, 701/207, 209, 202, 201, 23, 24, 25

(56) References Cited

U.S. PATENT DOCUMENTS

| 4,951,211 | A | * | 8/1990 | De Villeroche | ............. | 701/202 |
|---|---|---|---|---|---|---|
| 5,177,685 | A | * | 1/1993 | Davis et al. | ................. | 701/202 |
| 6,173,277 | B1 | * | 1/2001 | Ashby | ......................... | 701/208 |
| 6,184,823 | B1 | * | 2/2001 | Smith et al. | ................. | 701/209 |
| 6,330,858 | B1 | * | 12/2001 | McDonugh et al. | ......... | 701/211 |
| 6,336,073 | B1 | * | 1/2002 | Ihara et al. | ................. | 701/202 |

FOREIGN PATENT DOCUMENTS

| JP | 06-288782 | 10/1994 |
|---|---|---|
| JP | 07-083675 | 3/1995 |
| JP | 08-292716 | 11/1996 |
| JP | 09-061188 | 3/1997 |
| JP | 09-096538 | 4/1997 |
| JP | 2000-180194 | 6/2000 |

* cited by examiner

Primary Examiner—Richard M. Camby
(74) Attorney, Agent, or Firm—Wenderoth, Lind & Ponack, L.L.P.

(57) ABSTRACT

In a navigation apparatus Anavil, a CPU 1 searches for a plurality of routes from a starting point to a destination. Those route share the same starting point and the destination, but vary in course on the way. Then for route selection, the CPU 1 refers to position information provided by a locator 9 to determine which route the user is now moving. In this manner, the navigation apparatus can automatically select one route from several others derived through route search.

21 Claims, 34 Drawing Sheets

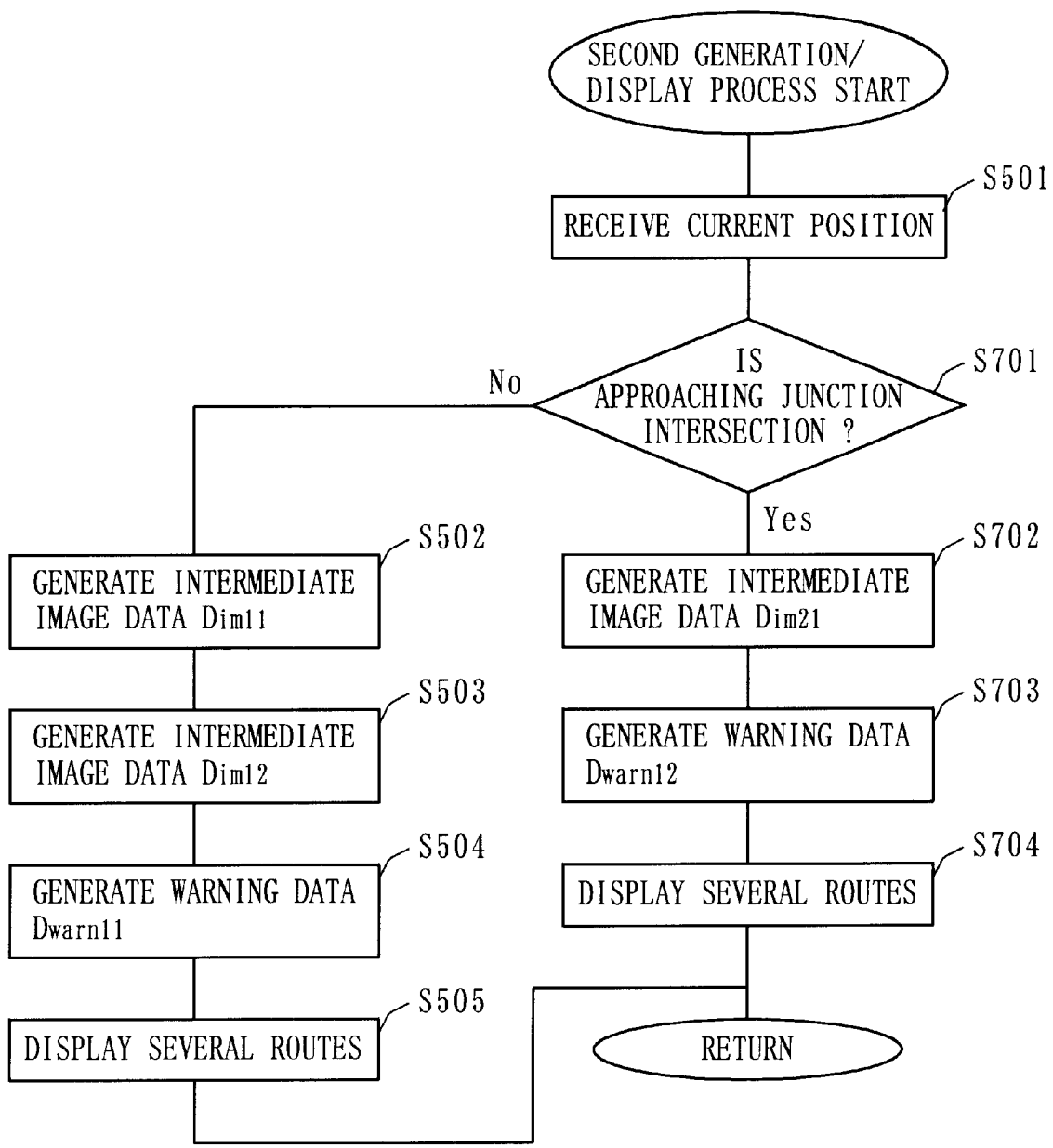

F I G. 1 9
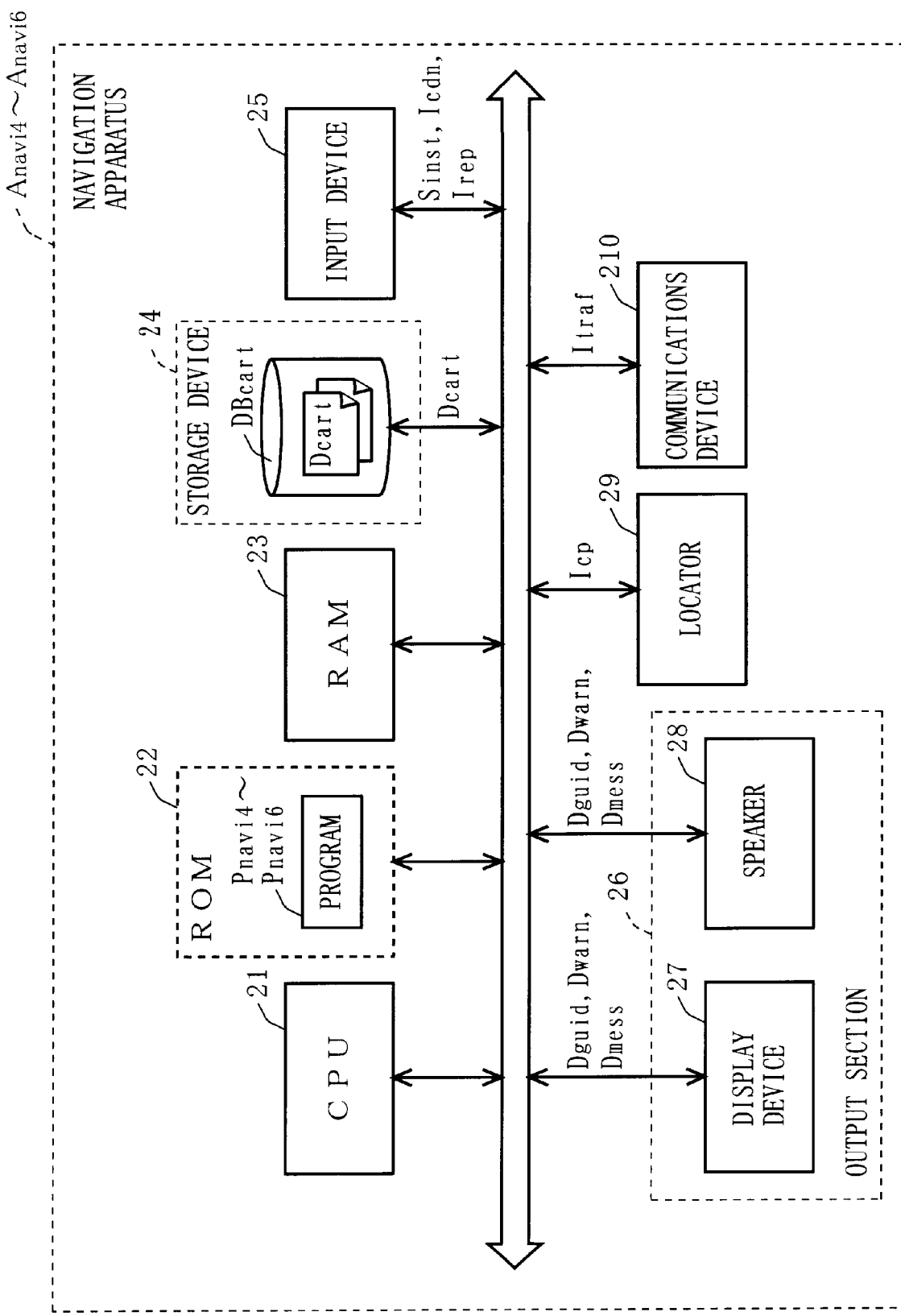

NAVIGATION APPARATUS

BACKGROUND OF THE INVENTION

1. Field of the Invention

The present invention relates to navigation apparatuses and, more specifically, to navigation apparatuses for guiding a user to a destination through the use of cartographic data.

2. Description of the Background Art

Described below are first and second background arts relating to the present invention, and also their problems.

First Background Art

Navigation apparatuses of a general type usually have the function of guiding a user along a route found to be optimum from a predetermined position to a user-defined destination.

Such a guidance function has recently been improved, i.e., several route options are to be found between departure point and destination which are both user-definable, and the user selects one route out of those. Along the selected route, the navigation apparatuses guide the user toward the destination.

As such, the user's preferences are taken into consideration at the time of route selection. In this sense, such an improvement has contributed the guidance function to be more user-friendly.

The guidance function after improvement, however, poses the problem of requiring the user to operate the input device of a navigation apparatus to select one route from several others. In the case where a large number of routes are searched and found, the user has to operate the input device again and again until he/she eventually selects one. As such, route selection under the improved guidance function requires the user cumbersome operation.

Second Background Art

Some navigation apparatuses also have the function of re-routing, with which route search is performed, if the user's vehicle goes off the originally-found route, to newly find any other route toward the destination from the user' position at that time (current position). With such a re-routing function, detour options are to be offered to the user when there occurs any traffic accident, traffic jam, or the like, on the originally-found route.

The problem here is that the conventional re-routing function is not activated unless the user goes off the originally-found route. The user thus has no way of knowing before going off the route whether he/she can avoid traffic accidents and jams on the way ahead with ease. If the worst happens, the user may find the detour option at hand takes him/her much longer to reach the destination.

There is another problem with the conventional re-routing function, that is, provided to the user is only one detour option. Consequently, the user's preferences or actual traffic conditions are not appropriately reflected in the detour route. More specifically, users have their own preferences, and some may want to go along major roads if possible at all, or reaching the destination as soon as possible may be of their high priority. As such, offering only one detour option under the conventional re-routing function is not sufficient to meet the users' varying preferences.

Moreover, after taking the offered detour route, the user may find it also jammed. If so, with the conventional re-routing function offering only one detour option, the user has is to go off the detour route to have any other alternative route. The conventional re-routing function is not thus helpful enough for the user to find detour routes as traffic conditions demand.

SUMMARY OF THE INVENTION

Therefore, an object of the present invention is to provide navigation apparatuses capable of automatically selecting one route from several others derived through route search.

Another object of the present invention is to provide navigation apparatuses capable of offering a user, before going off the originally-found route, several other route options.

The present invention has the following features to attain the objects above.

A first aspect of the present invention is directed to a navigation apparatus for guiding a user to a destination through the use of cartographic data. The navigation apparatus comprises: a route search section for searching for a plurality of routes from a starting point to one or more of destinations by using the cartographic data, and generating route data for each of the found routes; a movement information generation section for generating movement information which relates to the user's movement; a selection section for selecting, based on the movement information generated by the movement information generation section, one of the route data plurally generated by the route selection section; a guidance data generation section for generating, based on the route data selected by the selection section and the cartographic data, guidance data for guiding the user to the corresponding destination; and an output section for outputting an image or a sound for guiding the user toward the destination in accordance with the guidance data generated by the guidance information generation section.

A second aspect of the present invention is directed to a navigation apparatus for guiding a user to a destination through the use of cartographic data. The navigation apparatus comprises: a route search section for searching for a first route from a departure point toward the destination by using the cartographic data; a guidance data generation section for generating guidance data for guiding the user toward the destination based on the first route found by the route search section and the cartographic data; and an output section for outputting the guidance data generated by the guidance information generation section. When a predetermined starting condition is satisfied during when the guidance data is being outputted, the route search section further searches for a plurality of second routes from the user's current position toward the destination. The navigation apparatus further includes a warning data generation section to generate warning data for notifying the user of the plurality of second routes found by the route search section. The warning data thus generated by the warning data generation section is also outputted from the output section. Here, the plurality of second routes are varying in course on the way from the user's current position to the same destination as the first route, and should not coincide with the first route.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a flowchart showing a second generation/display process as another example of step S207 of FIG. 2;

FIG. 19 is a block diagram showing the hardware structure of a navigation apparatus Anavi4 according to a fourth embodiment of the present invention;

DESCRIPTION OF THE PREFERRED EMBODIMENTS

Figure 1:
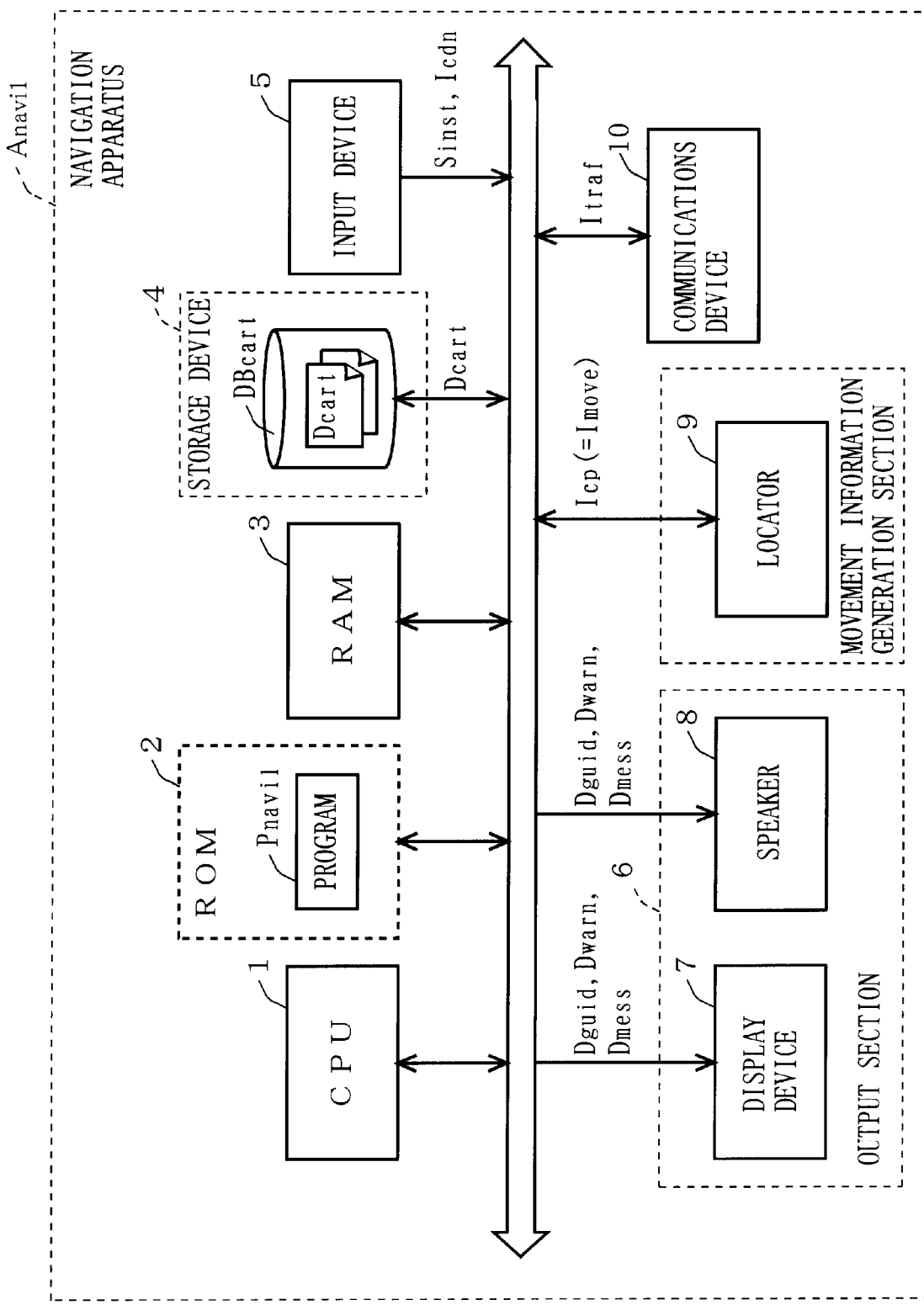
FIG. 1 is a block diagram showing the structure of a navigation apparatus Anavi1 according to a first embodiment of the present invention.

FIG. 1 shows the hardware structure of a navigation apparatus Anavi1 according to a first embodiment of the present invention. In this embodiment, the navigation apparatus Anavi1 is of a vehicle-mounting type, including a CPU 1, a ROM 2, a RAM 3, a storage device 4, an input device 5, an output section 6, a locator 9, and a communications device 10.

The ROM 2 is a program memory on which a program Pnavi1 for the navigation apparatus Anavi1 has been previously recorded. After the navigation apparatus Anavi1 is turned on, the CPU 1 starts executing the program Pnavi1 in the ROM 2. During when the program Pnavi1 is executed, the CPU 1 uses the RAM 3 as a working area.

The storage device 4 is typically composed of a DVD drive, a CD drive, a hard disk drive, or an IC memory, and stores a cartographic database DBcart.

The cartographic database DBcart may be of a known type, and composed of a collection of cartographic data Dcart included in one or more files. The cartographic data Dcart generally includes display data which is displayed as a map on a display device 7, and road network data which represents road connections on the map.

The map here is a written representation of the geographic features on a given scale together with graphic characters and map symbols on a plane. This map is different from a route diagram, which will be described later. Examples of the map are a bird's eye view, and a plane view, among others. The bird's eye view represents three dimensional geographic and graphic features on a plane viewed from the above. The plane view represents objects on the ground projected onto a plane. In the plane view, those objects appear as viewed from directly above.

The road network data represents road connections by nodes and links, which correspond to intersections and roads, respectively. Since the road network data is known, no further description is given.

The cartographic data Dcart has been previously provided with additional information Iaddi. In the present embodiment, the additional information Iaddi is a cost or information about intersection names. The information about intersection names defines main intersections on the road network by name, and is assigned to nodes representing those main intersections. The cost is a weight each assigned to links, indicating a time or a distance to be taken for the user's vehicle to pass through the corresponding road. The cost is used at the time of route search (step S205 of FIG. 2).

The input device 5 is typically composed of a remote controller, a touch sensor, keys, buttons, or a mouse, all of which are user operable, or a microphone through which the user inputs voice. Alternatively, the input device 5 may be composed of two or more of a remote controller, a touch sensor, keys, buttons, a mouse, and a microphone, depending on the design specifications of the navigation apparatus Anavi1.

The output section 6 is typically composed of the display device 7 and a speaker 8, and various data generated by the CPU 1 is outputted therefrom to the user. The various data will be described later when appropriate.

The locator 9 corresponds to a movement information generation section in claims, and is typically composed of a GPS receiver (Global Positioning System). The locator 9 detects the user's current position, and generates position information Icp which indicates the coordinates of the position. Thus generated position information Icp is transferred to the CPU 1.

The communications device 10 is typically composed of a VICS (Vehicle Information and Communication System) receiver, and received thereby is traffic information Itraf from beacons located in the proximity of roads. In the present embodiment, the traffic information Itraf specifies, by coordinates, the locations where the traffic accidents or jams are occurring. The communications device 10 may include a mobile phone to provide the navigation apparatus Anavi1 with the function of connecting to the Internet.

Described next is the operation of the navigation apparatus Anavi1. After the navigation apparatus Anavi1 is turned on, the CPU 1 starts executing the program Pnavi1 recorded on the ROM 2. Here, the first half of the procedure written in the program Pnavi1 is shown in FIG. 2, and the second half in FIG. 3.

Figure 2:
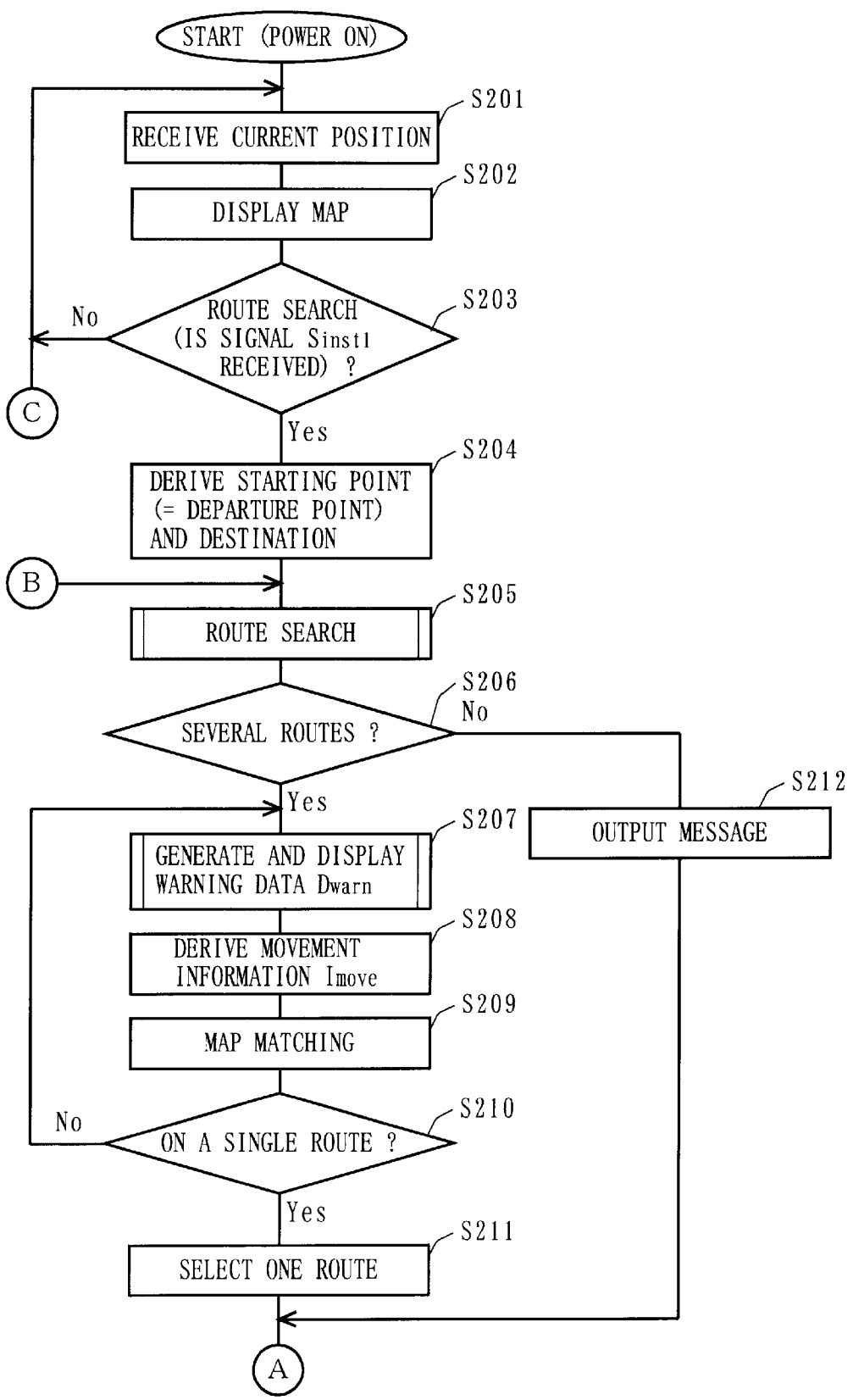
FIG. 2 illustrates the first half of a main flowchart showing the procedure of a CPU 1 of FIG. 1.

Referring to FIG. 2, the CPU 1 receives from the locator 9 the position information Icp indicating where the user currently is (step S201).

In step S202, from the cartographic database DBcart into the RAM 3, the CPU 1 reads the cartographic data Dcart representing the map of a predetermined area $\alpha 1$. Here, the predetermined area $\alpha 1$ covers the area around the user's current position indicated by the position information Icp. The CPU 1 then performs map matching by using the cartographic data Dcart on the RAM 3 and the position information Icp so as to generate display data Ddis, indicating the user's current position by a mark appropriately disposed on any corresponding road in the predetermined area $\alpha 1$. The resultant display data Ddis is forwarded to the display device 7. The display device 7 applies a display process in accordance with the display data Ddis so as to display on its screen a map including the mark overlaid on the position where the user is (step S202).

The CPU 1 then determines whether or not to perform route search (step S203). As a representative example, the deciding factor is an instruction signal Sinst1 coming from the input device 5, and responding thereto, the CPU 1 starts route search. The input device 5 generates the instruction signal Sinst1 if the user operates a predetermined portion thereof assigned to start route search.

If the CPU 1 has received no instruction signal Sinst1, before step S203, the procedure returns to step S201.

If having received, the CPU 1 determines now is the time to perform route search, and the procedure goes to step S204. The CPU 1 then derives the coordinates of starting point and destination for route search this time (step S204). Instep S204, the starting point is the user's departure point. As a representative example, the CPU 1 derives the coordinates of departure point and destination by decoding coordinates information Icdn generated and provided by the input device 5. Here, the coordinates information Icdn is the one specifying, by coordinates, the departure point and the destination inputted by the user via the input device 5.

As another specific example, in step S204, the user may input only the destination through the input device 5. In response, the input device 5 generates the coordinates information Icdn for specifying the inputted destination by coordinates. The CPU 1 receives the resultant coordinates information Icdn, from which the coordinates of the destination are to be derived. The CPU 1 also receives from the locator 9 the position information Icp, from which the coordinates of the user's current position are to be derived. Thus derived coordinates of the user's current position are used as those of the departure point.

The CPU 1 then searches for several routes under any well known route search algorithm such as the Dijkstra's algorithm (step S205). At this time, the CPU 1 works as a route search section in claims.

Thus found routes share the same starting point and destination, which are those derived in step S204. The routes, however, differ in course on the way. Such routes include, for example, those taking the user to his/her destination in the shortest distance and the second-shortest distance, or in the shortest time and the second-shortest time. In the below, an expression "optimum route" denotes a route taking the user from the current position toward the destination in the shortest distance or time, while an expression "next-optimum route" in the second-shortest distance or time.

Figure 4:
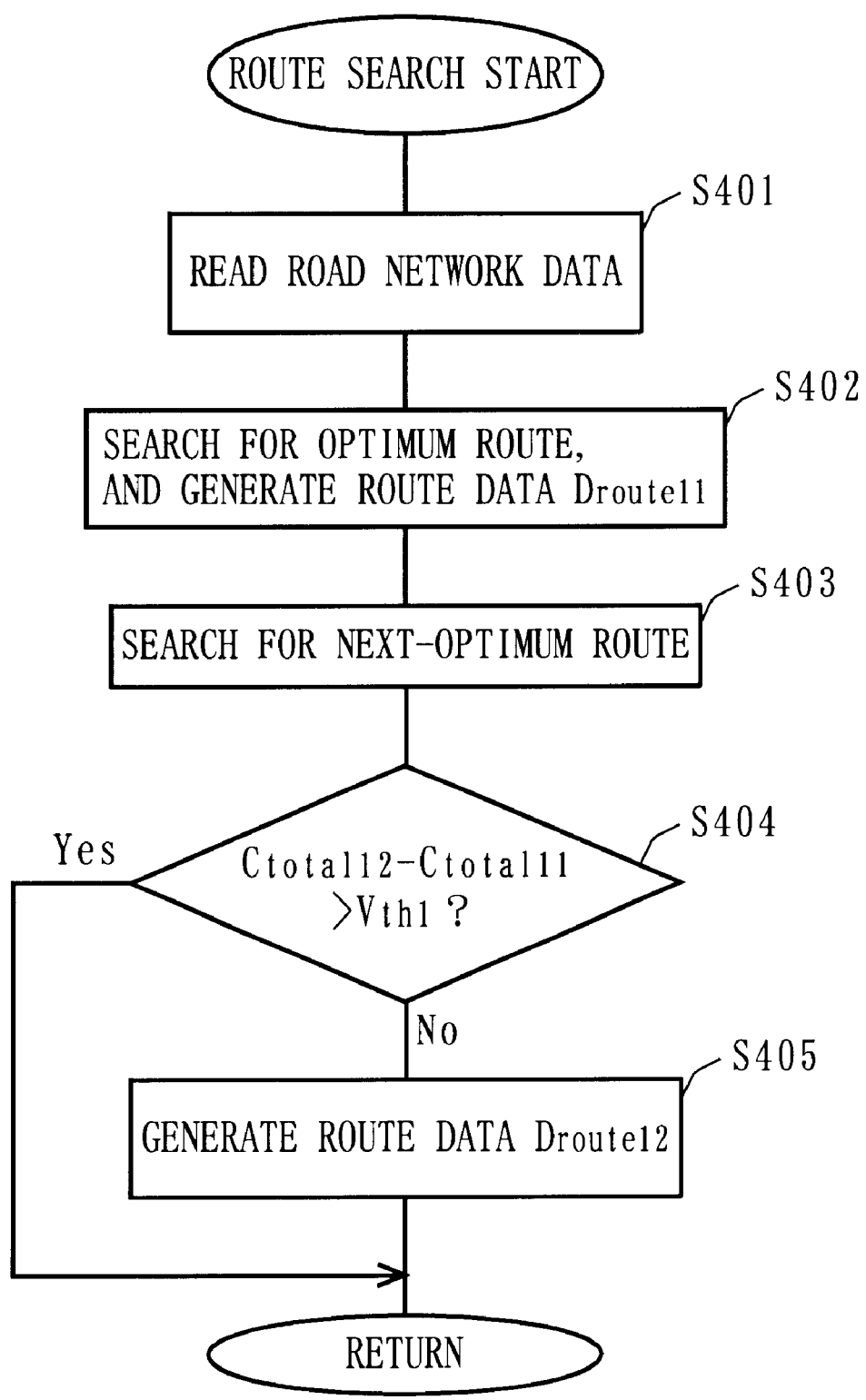
FIG. 4 is a flowchart showing the detailed procedure of route search (step S205) of FIG. 2.

The route search in step S205 is described in more detail with reference to the flowchart of FIG. 4. In FIG. 4, from the cartographic database DBcart into the RAM 3, the CPU 1 first reads the cartographic data Dcart of a predetermined area $\alpha 2$(step S401). Here, the predetermined area $\alpha 2$ typically is a rectangular region including both the starting point and the destination derived in step S204.

The CPU 1 then searches for one single optimum route by using the cartographic data Dcart on the RAM 3, more specifically, the road network data and the cost, i.e., additional information Iaddi. Then, route data Droute11 which represents the found optimum route is generated on the RAM 3 (step S402). Here, the route data Droute11 is typically composed of a node string configuring the optimum route. In step S402, a total cost Ctotal11 of the optimum route is written onto the RAM 3. Here, the total cost Ctotal11 is a value obtained by adding every cost previously assigned to all of the links configuring the optimum route.

Also with the road network data on the RAM 3 and the cost, i.e., additional information Iaddi, the CPU 1 searches for a next-optimum route (step S403). Here, the cost for each of the links configuring the optimum route derived in step S402 is set larger this time, whereby a next-optimum route can be successfully derived in step S403 without coinciding with the optimum route. In step S403, a total cost Ctotal12 of the next-optimum route is written onto the RAM 3. Here, the total cost Ctotal12 is a value obtained by adding every cost assigned to all of the links configuring the next-optimum route.

In some places, the difference in time or distance between the optimum and next-optimum routes may be quite large, and if so, the resultant next-optimum route is considered not practical enough. In this point of view, after step S403 is through, the CPU 1 determines whether or not the difference between the total costs Ctotal11 and Ctotal12 is exceeding a predetermined threshold value Vth1 (step S404). Here, the threshold value Vth1 is determined according to the design specifications of the navigation apparatus Anavi1, and is criteria by which to judge whether the next-optimum route is practical.

If the difference is exceeding the threshold value Vth1, the CPU 1 determines that no next-optimum route has been derived, and the procedure now goes to step S206 of FIG. 2. On the other hand, if not exceeding, the CPU 1 generates, on the RAM 3, route data Droute12 which represents the next-optimum route derived in step S403 (step S405). The route data Droute12 is typically composed of a node string configuring the next-optimum route.

After step S405 is through, the procedure goes to step S206 of FIG. 2. The CPU 1 then determines whether or not both the optimum and next-optimum routes are derived in step S205 (step S206). This determination is based on whether the RAM 3 carries the route data Droute11 only or together with the route data Droute12.

If determined in step S206 that only the optimum route has been derived, the procedure goes to step S212. The CPU 1 then generates message data Dmess1, and transfers it to the output section 6. The message data Dmess1 is image data or sound data, with which the user is notified in the form of a message that derived in step S205 is only the optimum route. In accordance with the received message data Dmess1, the output section 6 performs the display process in the display device 7, or a sound output process in the speaker 8 so as to output the message to the user (step S212). After step S212 is through, the procedure goes to step S213 (will be described later) of FIG. 3, i.e., circled letter A.

On the other hand, if determined in step S206 that both of the optimum and next-optimum routes have been derived, the procedure goes to step S207 for a process of generating and displaying warning data Dwarn (step S207). In the present embodiment, any one of the following first to fourth generation/display processes is performed in step S207.

Figure 5:
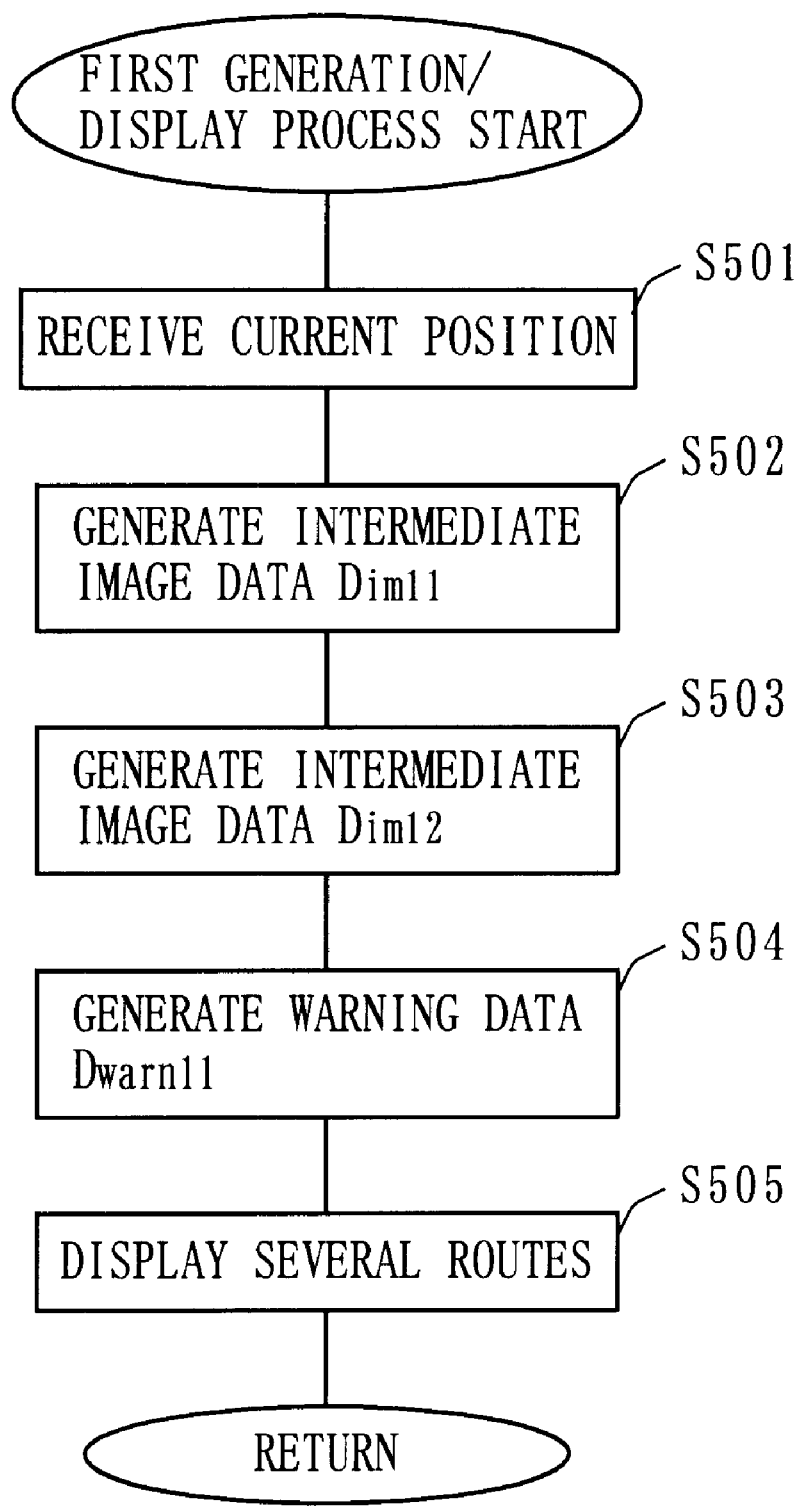
FIG. 5 is a flowchart showing a first generation/display process as an example of step S207 of FIG. 2.

The first generation/display process is now described in detail by referring to the flowchart of FIG. 5. In the procedure of FIG. 5, used as the basis of the warning data Dwarn is a displaying portion of the cartographic data Dcart read out in step S401.

In FIG. 5, the CPU 1 receives from the locator 9 the position information Icp indicating where the user currently is (step S501). The CPU 1 then performs map matching by using both the position information Icp and the corresponding cartographic data Dcart so as to generate, on the RAM 3, intermediate image data Dim11 in which a mark denoting the user's current position is appropriately disposed on any corresponding road in the map (step S502).

On the basis of the coordinates information Icdn of the destination used in step S205 and the intermediate image data Dim11 generated in step S502, the CPU 1 then generates, on the RAM 3, intermediate image data Dim12 in which a mark denoting the destination is disposed on the map (step S503).

Moreover, on the basis of the route data Droute11 and Droute12, and the intermediate image data Dim12 generated in step S503 on the RAM 3, the CPU 1 generates warning data Dwarn11 which allows the optimum and next-optimum routes to be displayed on the map (step S504). More specifically, such warning data Dwarn11 allows the display device 7 to display the user's current position, the destination, and the optimum and next-optimum routes overlaid all together on the map.

In step S504, it is preferable if the warning data Dwarn11 displays the optimum and next-optimum routes in different colors or line styles on the map. With such warning data Dwarn11 displayed in step S505, the user can distinguish the optimum and next-optimum routes easily which is which.

In step S504, it is still preferable if the optimum route is displayed in more noticeable color or line style than the next-optimum route. Accordingly, the optimum route looks conspicuous with the warning data Dwarn11 displayed, enabling the user to intuitively recognize it.

It should be noted that steps S501 to S504 can be carried out in any desired order, but step S501 should be followed by step S502.

Figure 6A:
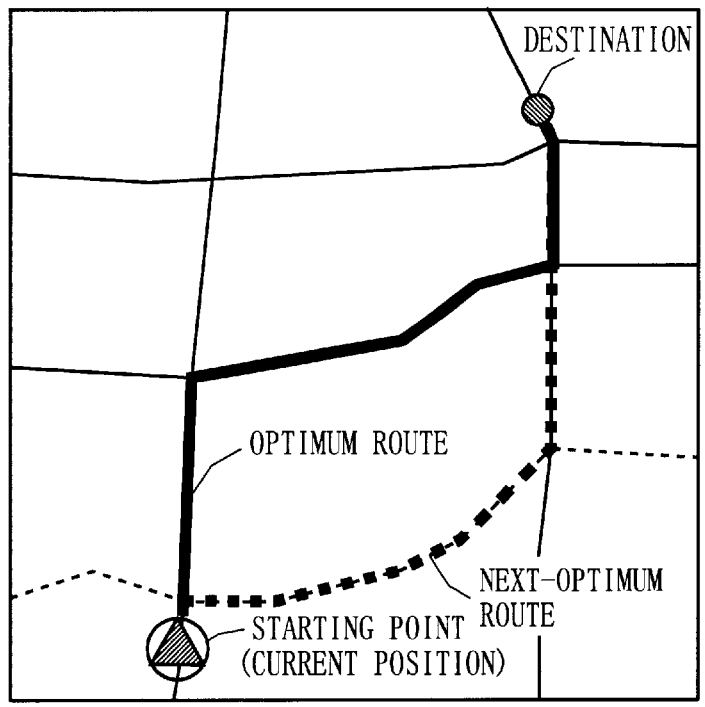
FIG. 6A is a diagram showing the result of a display process subjected to warning data Dwarn11 in step S505 of FIG. 5.

After step S504 is through, the CPU 1 transfers the generated warning data Dwarn11 to the display device 7. The display device 7 performs the display process in accordance with the warning data Dwarn11 so as to display on its screen a map image having, at least, the optimum and next-optimum routes overlaid thereon. Such a map image is shown in FIG. 6A. Through the map image, the user sees several available route options, i.e., optimum and next-optimum routes (step S505). After step S505, the procedure goes to step S208 of FIG. 2.

Described next is the second generation/display process by referring to FIG. 7. Compared with FIG. 5, the procedure of FIG. 7 further includes steps S701 to S704. This is the only difference therebetween, and in FIG. 7, any step identical to that in FIG. 5 is under the same step number and not described again.

In FIG. 7, after the CPU 1 receives the position information Icp (step S501), the procedure goes to step S701.

Here, the optimum and next-optimum routes share the same starting point and the destination, but vary in course on the way. The optimum and next-optimum routes thus head in different directions at a certain intersection. In the below, such an intersection is referred to as a junction intersection.

In step S701, in comparison between the route data Droute11 and Droute12 in terms of node strings, the CPU 1 specifies, by coordinates, which node is the junction intersection. Based on the coordinates of the node, i.e., junction intersection, and the coordinates indicated by the position information Icp, the CPU 1 determines whether or not the user is being close to the junction intersection (step S701). More specifically, in step S701, those coordinates are used to calculate the distance between the user's current position and the junction intersection, and the calculated value is compared with a predetermined threshold value Vth2. Here, the threshold value Vth2 is determined in advance according to the design specifications of the navigation apparatus Anavi1, and criteria by which to judge whether the user is approaching an intersection.

In step S701, if determined that the user is being close to no junction intersection, steps S502 to S505 are carried out, and as a result, the user sees an image based on the warning data Dwarn11.

On the other hand, if determined that the user is being close to the junction intersection in step S701, the procedure goes to step S702. The CPU 1 performs map matching by using the position information Icp and the corresponding cartographic data Dcart so as to generate, on the RAM 3, intermediate image data Dim21 in which a mark denoting the user's current position is correctly overlaid on any corresponding road in the map (step S702). Note herein that the cartographic data Dcart in step S702 represents an enlarged map covering the area around the junction intersection. In this sense, steps S702 and S502 are not the same.

On the basis of the route data Droute11 and Droute12 derived in step S205, and the intermediate image data Dim21 generated in step S702, the CPU 1 generates warning data Dwarn12 in which roads around the junction intersection on the optimum and next-optimum routes are arranged on the map (step S703). More specifically, the warning data Dwarn12 is image data which allows the display device 7 to display an enlarged map of around the junction intersection including the starting point, and the optimum and next-optimum routes together.

In step S703, it is preferable if the optimum and next-optimum routes are displayed in different colors or line styles. It is still preferable if the optimum route is displayed in more noticeable color or line style than the next-optimum route. Moreover, steps S702 and S703 may be switched in order.

Figure 6B:
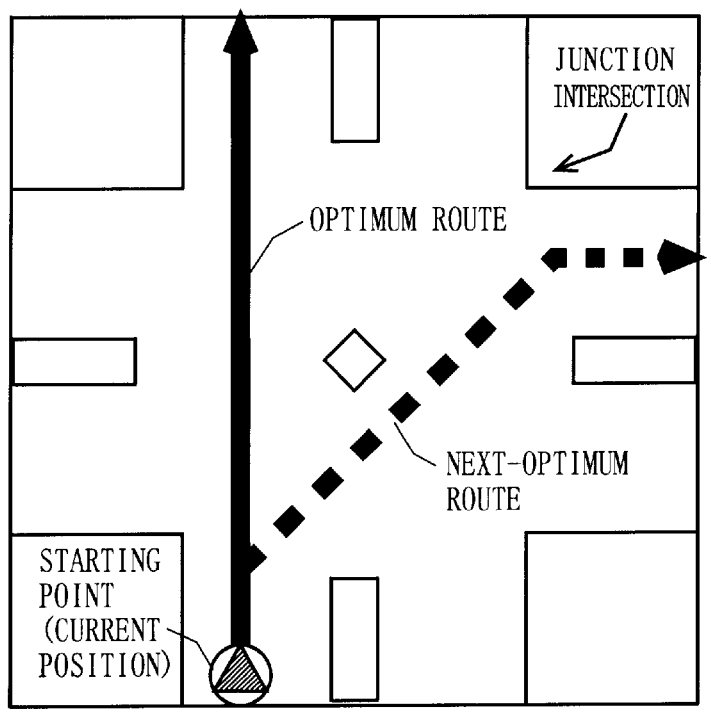
FIG. 6B is a diagram showing the result of the display process subjected to warning data Dwarn12 in step S704 of FIG. 7.

After step S703 is through, the CPU 1 transfers the generated warning data Dwarn12 to the display device 7. The display device 7 performs the display process based on the warning data Dwarn12 so as to display on its screen such an image as shown in FIG. 6B. The image at least shows the optimum and next-optimum routes overlaid on the enlarged map of around the junction intersection. With such an image, the user can easily perceive the specific location where several routes (optimum and next-optimum routes) are branched (step S704). After the image is displayed, the procedure goes to step S208 of FIG. 2.

Figure 8:
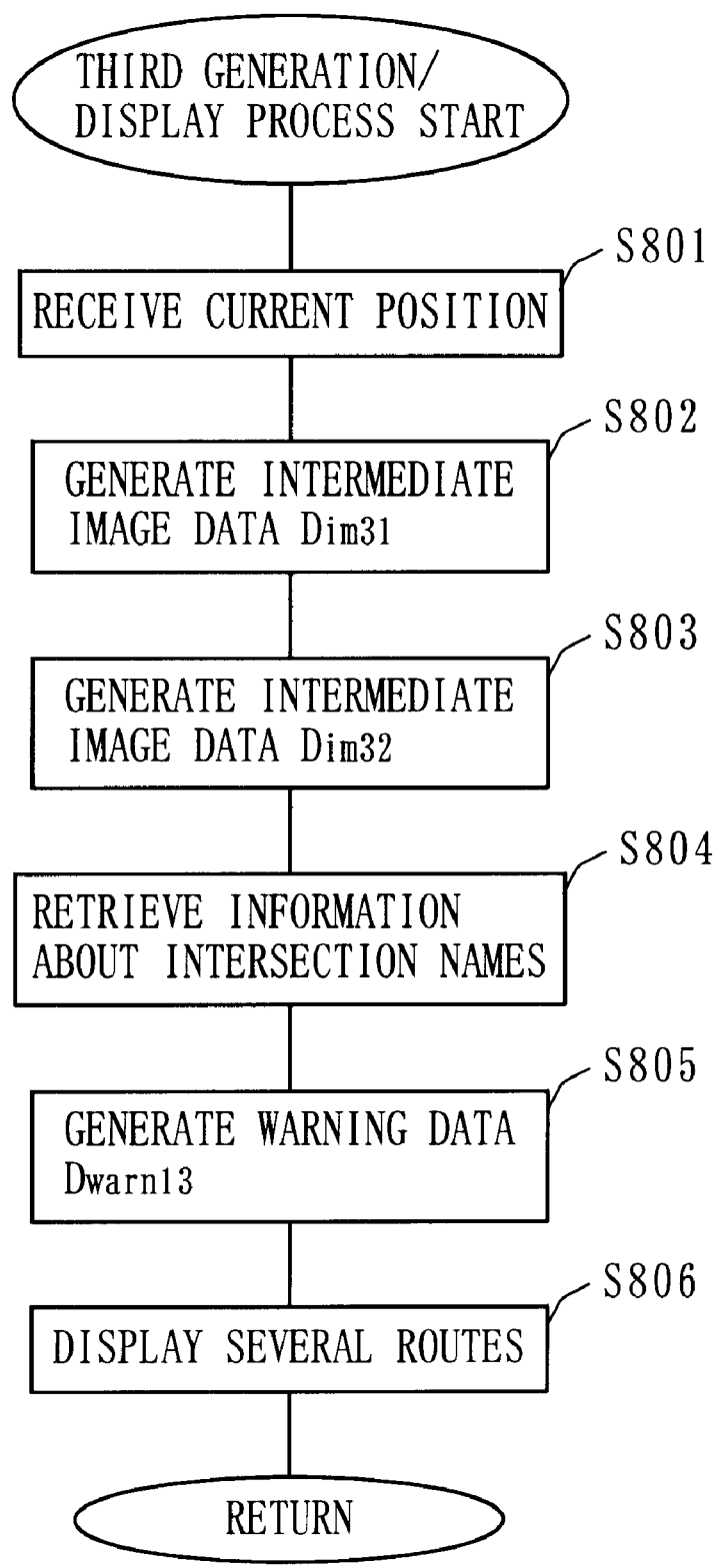
FIG. 8 is a flowchart showing a third generation/display process as still another example of step S207 of FIG. 2.

Described next is the third generation/display process with reference to the flowchart of FIG. 8. In FIG. 8, the CPU 1 receives from the locator 9 the position information Icp indicating where the user currently is (step S801). Then, the CPU 1 generates intermediate image data Dim31 by using background image data Dbg1 and the received position information Icp (step S802). Here, the background image data Dbg1 has been previously at hand, and represents the background of the image displayed in step S806. The intermediate image Dim31 shows the user's departure point, which is indicated by the position information Icp, by a mark overlaid on the background image of the background image data Dbg1.

Based on the coordinates information Icdn of the destination used in step S205, and the intermediate image data Dim31 generated in step S802, the CPU 1 generates intermediate image data Dim32 having another mark overlaid on the background image to indicate the destination (step S803).

The CPU 1 reads, from the cartographic database DBcart, the additional information Iaddi for whatever intersection names in need (step S804). To be more specific, read in step S804 are names of the main intersections found in the route data Droute11 and Droute12, i.e., located on the optimum and next-optimum routes.

On the basis of the intersection names read in step S804 and the intermediate image data Dim32 generated in step S803, the CPU 1 disposes the intersection names onto the background image, and then generates warning data Dwarn13 on the RAM 3 by connecting those intersection names by lines so that the optimum and next-optimum routes are represented thereby (step S805). In more detail, the warning data Dwarn13 allows the display device 7 to display a route diagram, in which several major intersections located on several routes are connected by lines.

In step S805, similarly in step S503, the optimum route is preferably displayed in different color or line style from the next-optimum route. Further, the color or line style of the optimum route preferably looks conspicuous than that of the next-optimum route.

It should be noted here that steps S801 to S805 can be carried out in any desired order, but step S801 should be followed by step S802.

Figure 9:
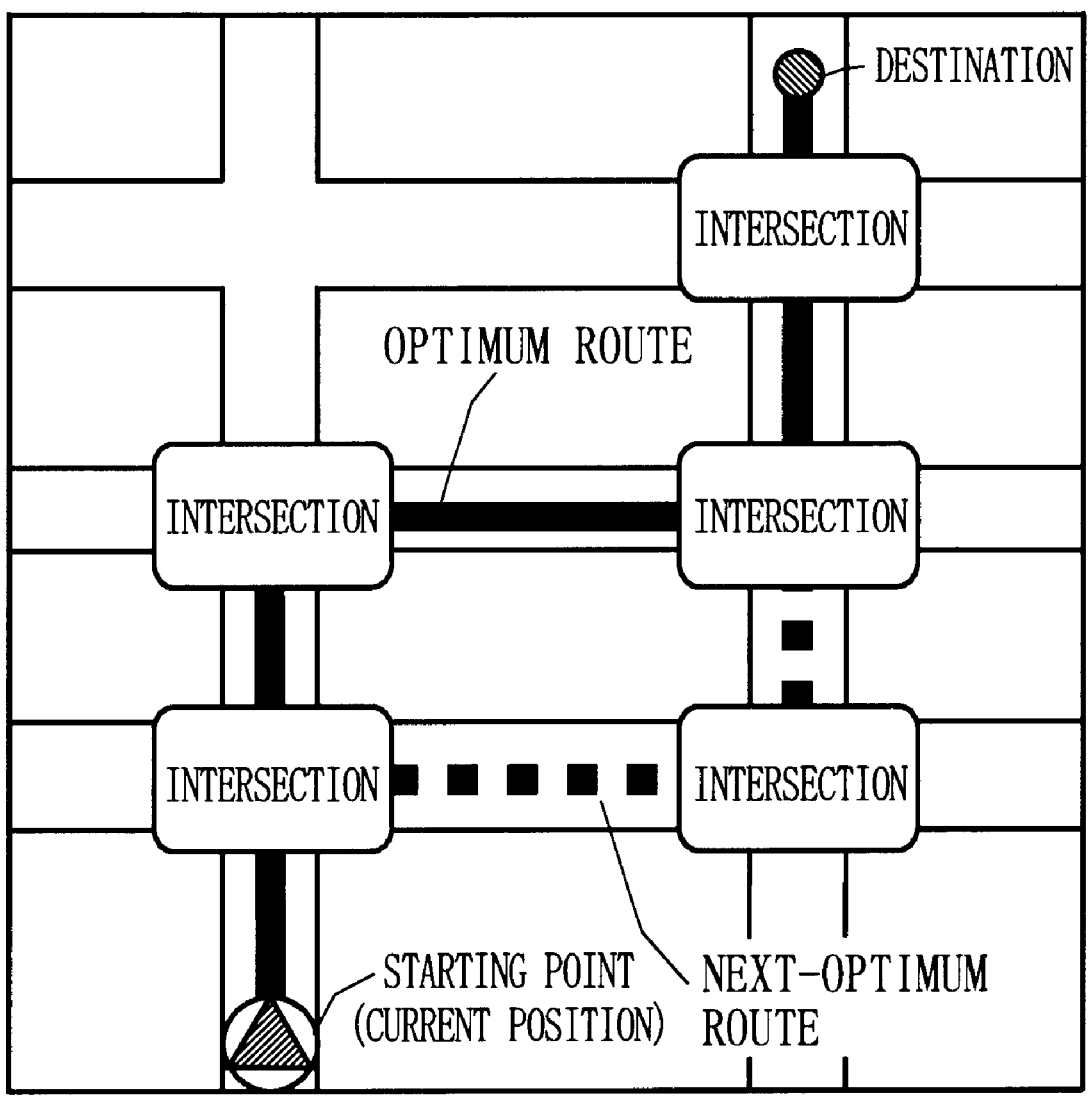
FIG. 9 is a diagram showing the result of the display process subjected to warning data Dwarn13 in step S806 of FIG. 8.

After step S805 is through, the CPU 1 transfers the generated warning data Dwarn13 to the display device 7. The display device 7 performs the display process based on the received warning data Dwarn13 so as to display on its screen such a route diagram as shown in FIG. 9. With such a route diagram displayed, the user can perceive what route options are available, i.e., optimum and next-optimum routes (step S806). After step S806 is through, the procedure goes to step S208 of FIG. 2.

Figure 10:
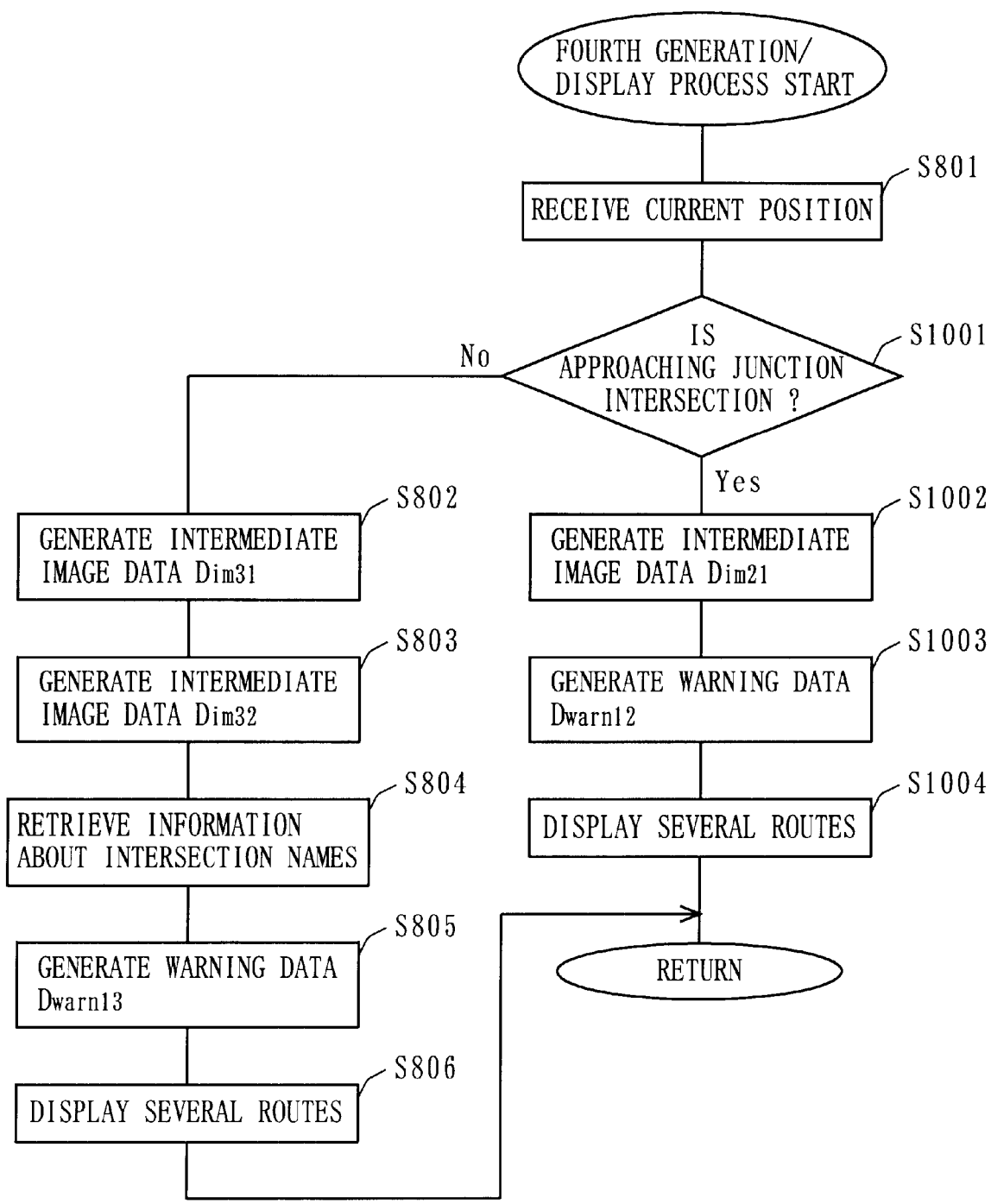
FIG. 10 is a flowchart showing a fourth generation/display process as still another example of step S207 of FIG. 2.

Described next is the fourth generation/display process by referring to FIG. 10. Compared with FIG. 8, the procedure of FIG. 10 further includes steps S1001 to S1004. This is the only difference therebetween, and in FIG. 10, any step identical to that in FIG. 8 is under the same step number and not described again. Also, the processes in steps S1001 to S1004 correspond to those of steps S701 to S704 which have been described in the second generation/display process, and thus are not described here in detail.

Also under the fourth generation/display process, the user can easily perceive the exact location where the routes, i.e., optimum and next-optimum routes, start to head in each different direction. After step S1004 is through, the procedure goes to step S208 of FIG. 2.

From those several routes displayed after step S207, the user selects one of those. In the present embodiment, the most striking feature is that the CPU 1 automatically performs route selection by monitoring the user's (i.e., the vehicle's) actual movement without the user having to operate the input device 5. In the below, an exemplary method for selecting one single route is described.

The CPU 1 instructs the locator 9 to transfer the position information Icp, i.e., movement information Imove. In response, the locator 9 generates the position information Icp indicating where the user currently is, and transfers it to the CPU 1. At this time, the locator 9 exemplarily works as the movement information generation section in claims. The CPU 1 then receives the position information Icp coming from the locator 9 (step S208). Alternatively, in the present embodiment, the CPU 1 may use the position information Icp received in step S207 as the movement information Imove.

The CPU 1 then performs map matching by using the cartographic data Dcart on the RAM 3 and the received position information Icp so as to calculate the user's current position on the road network on the map (step S209). At this time, the CPU 1 works as a calculation section in claims.

On the basis of the calculation result in step S209, the CPU 1 determines on which of the optimum and next-optimum route the user currently is (step S210). As is well known, map matching performed in step S209 is done to bring the user's current position to the corresponding road on the map. The calculation result of the map matching thus tells the CPU 1 on which route the user is now moving.

If the user is determined as being at the junction of the several routes, the procedure returns to step S207 so that those several routes remain displayed for the user.

In step S210, if the user is determined as being on one specific route (i.e., optimum or next-optimum route), the route is accordingly selected (step S211). That is, the CPU 1 selects either the route data Droute11 or Droute12. In step S211, the CPU 1 works as a selection section in claims. Then, the procedure goes to step S213 of FIG. 3, i.e., circled letter A.

Actually, the user may be on none of the routes. If this is the case, with no relation to the present embodiment, no description is given here.

By the time when step S211 or S212 has been through, the CPU 1 will be completed specifying one route so as to guide the user therealong, i.e., optimum or next-optimum route. More specifically, the CPU 1 guides the user's vehicle depending on which route data has been selected, i.e., based on Droute11 or Droute12 (step S213).

Figure 11:
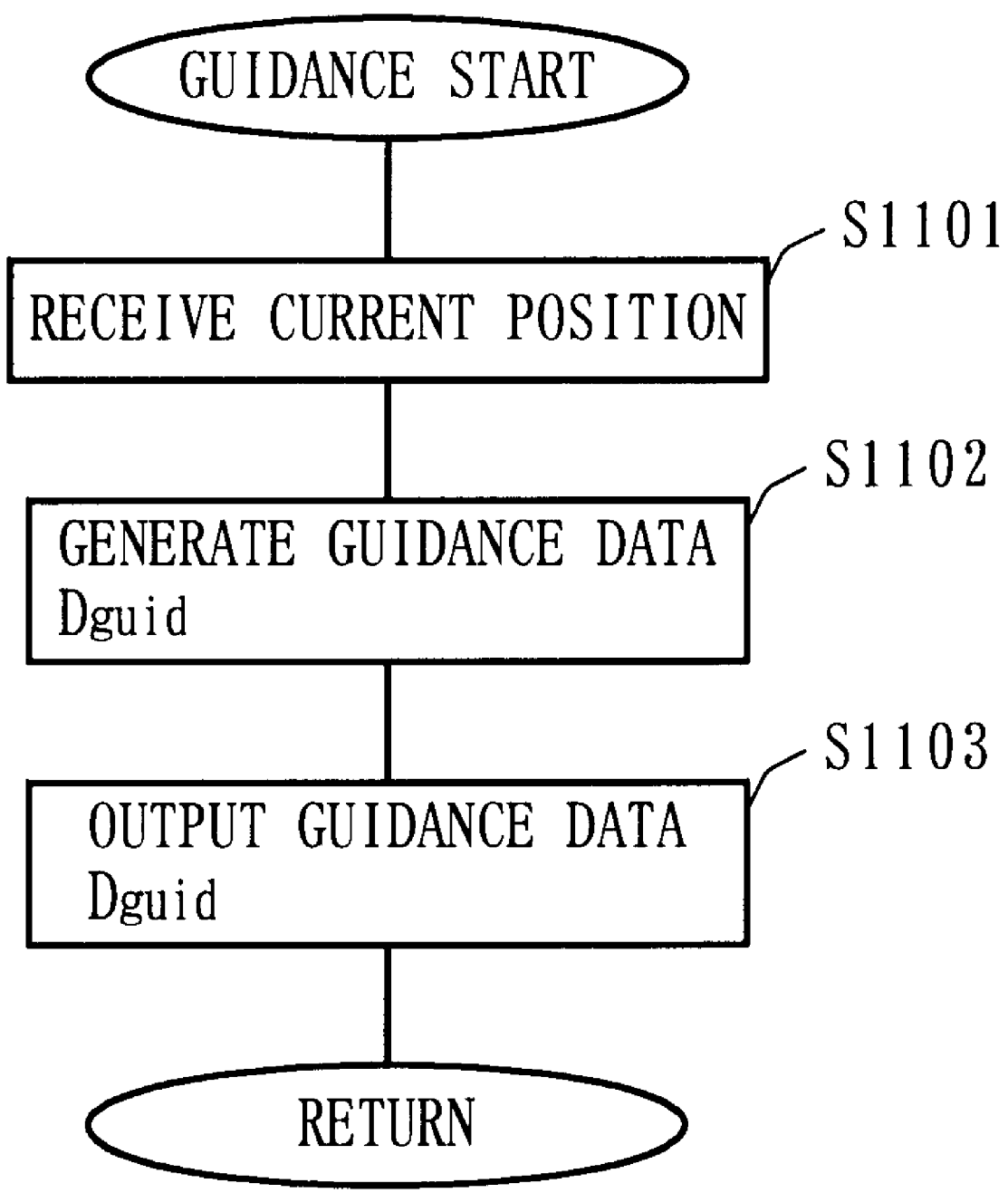
FIG. 11 is a flowchart showing the detailed procedure of a guidance process (step S213) of FIG. 2.

Here, FIG. 11 is a flowchart showing the detailed procedure in step S213. In FIG. 11, the CPU 1 receives from the locator 9 the position information Icp indicating where the user currently is (step S1101).

In step S1102, from the map database DBcart to the RAM 3, the CPU 1 reads out the cartographic data Dcart representing the map of a predetermined area α3. Here, the predetermined area α3 typically covers the area around the user's current position indicated by the position information Icp. In the case that the cartographic data Dcart which is supposed to be read in step S1102 has been already read out to the RAM 3 in step S202, the CPU 1 uses the cartographic data Dcart on the RAM 3, and does not perform reading from the cartographic database DBcart.

Then, by using the cartographic data Dcart on the RAM 3, the route data Droute1 (i.e., route data Droute11 or Droute12 whichever selected in step S211), and the position information Icp, the CPU 1 generates image data. The image data allows the display device 7 to display the route from the user's current position toward the destination overlaid on any corresponding road on the map. In the case that the user's current position is being close to an intersection, the CPU 1 generates sound data instructing the user to make a left or right turn or go straight. In such a manner, the CPU 1 generates, on the RAM 3, the guidance data Dguid composed of image data only or together with sound data (step S1102). At this time, the CPU 1 works as a guidance data generation section in claims.

Figure 12:
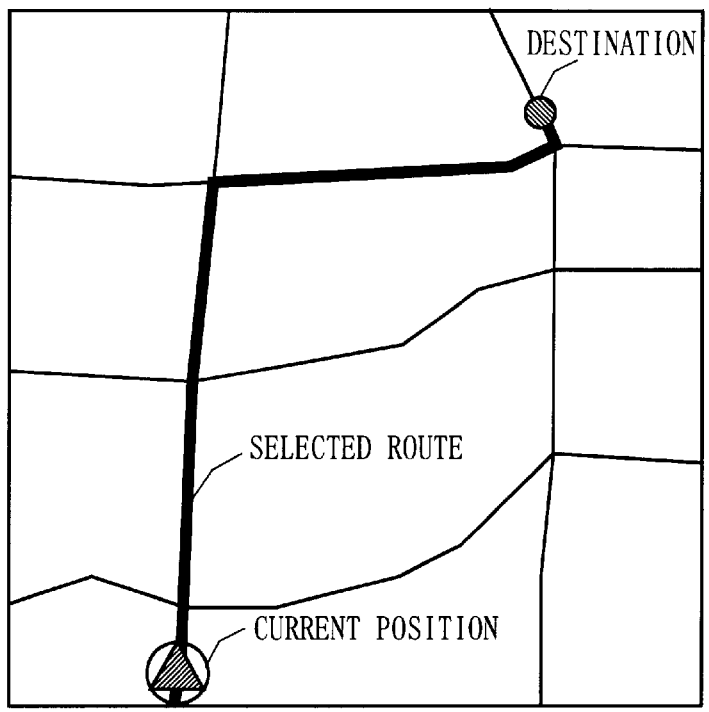
FIG. 12 is a diagram showing the result of the display process subjected to guidance data Dguid in step S1103 of FIG.

The CPU 1 then transfers the guidance data Dguid to the output section 6. The output section 6 performs the display process in the display device 7, or the sound output process in the speaker 8 based on the guidance data Dguid. More specifically, the display device 7 performs the display process based on the image data included in the guidance data Dguid so as to display on its screen such an image as shown in FIG. 12. In FIG. 12, the screen of the display device 7 displays the user's current position, the destination, and the route selected in step S211 overlaid all together on the map. The speaker 8 outputs sound to the user based on the sound data in the guidance data Dguid (step S1103). Thereby, the CPU 1 guides the user toward the destination.

After step S1103 is through, the procedure goes to step S214. Then, the CPU 1 compares the user's current position and the destination derived in step S204 in terms of coordinates so as to determine whether or not the user has reached the destination (step S214).

If the coordinates of the current position coincide with those of the destination, the CPU 1 determines that the user has reached the destination, and the procedure returns to step S201, i.e., circled letter C. If not, the procedure goes to step S215, and the CPU 1 determines whether a predetermined condition is satisfied for starting re-routing (step S215). Here, the deciding factor in step S215 is an instruction signal Sinst2 coming from the input device 5, and responding thereto, the CPU 1 starts re-routing. The input device 5 generates the instruction signal Sinst2 if the user operates a predetermined portion thereof assigned to start re-routing.

If the instruction signal Sinst2 has not been received before step S215, the procedure returns to step S213 so that the user is guided continuously along the currently-found route. On the other hand, if received, the CPU 1 determines that now is the time to start re-routing, and the procedure goes to step S216. The CPU 1 then derives the coordinates of the starting point for re-routing this time (step S216). More specifically, in step S216, the CPU 1 receives the position information Icp from the locator 9 so that the user's current position can be specified by coordinates. The user's current position thus derived is now used as the starting point for re-routing. Note that, in re-routing, the coordinates of the destination remain the same as those used in step S204.

When step S216 is through, the procedure returns to step S205 for re-routing. The processes thereafter are understood from the above, and not described here again. It should be noted that a starting point is a departure point in the above, but in re-routing, a starting point is the user's current position. Here, in the similar manner described above for searching the next-optimum route, the cost for each of the links configuring any already-found route is set larger this time, whereby any new route can be successfully derived without coinciding with the route found so far.

At the time of generation and display of the warning data Dwarn after re-routing (step S207), displayed are several route options starting from the starting point, i.e., the current position (see FIGS. 6A and 9).

As such, in the present embodiment, the navigation apparatus Anavi1 automatically selects one route from several others derived through route search on the basis of the user's movement, i.e., movement information Imove (position information Icp). The navigation apparatus Anavi1 guides the user along the selected route. With such function, the navigation apparatus Anavi1 does not require the user cumbersome operation for route selection.

In the above embodiment, the display device 7 applies the display process according to the warning data Dwarn11 to Dwarn13 so as to offer optimum and next-optimum routes to the user. Alternatively, the CPU 1 may generate warning data Dwarn1v, and transfer it to the speaker 8 to have the speaker 8 performed the audio output process in accordance therewith so as to provide the user with optimum and next-optimum routes by sound. Here, the warning data Dwarn1 may be outputted from the output section 6 in the form of image or sound.

In the above, searched and found by the CPU 1 are two routes, i.e., optimum and next-optimum routes. This is not restrictive, and three or more routes will do.

Moreover, in the above, the route data Droute1 is presumably composed of a node string, but may be of a link string.

Further, the deciding factor for starting re-routing is whether or not an instruction signal Sinst2 has been received before step S215. This is not restrictive, and the deciding factor may be any other condition set for the purpose. For example, the CPU 1 may start re-routing when the user's current position comes closer to an intersection, or when any traffic accident or jam is occurring on a route along which the user is guided in step S213. For the CPU 1 to know if any traffic accident or jam is occurring, the traffic information Itraf received by the communications device 10 is utilized.

Figure 13:
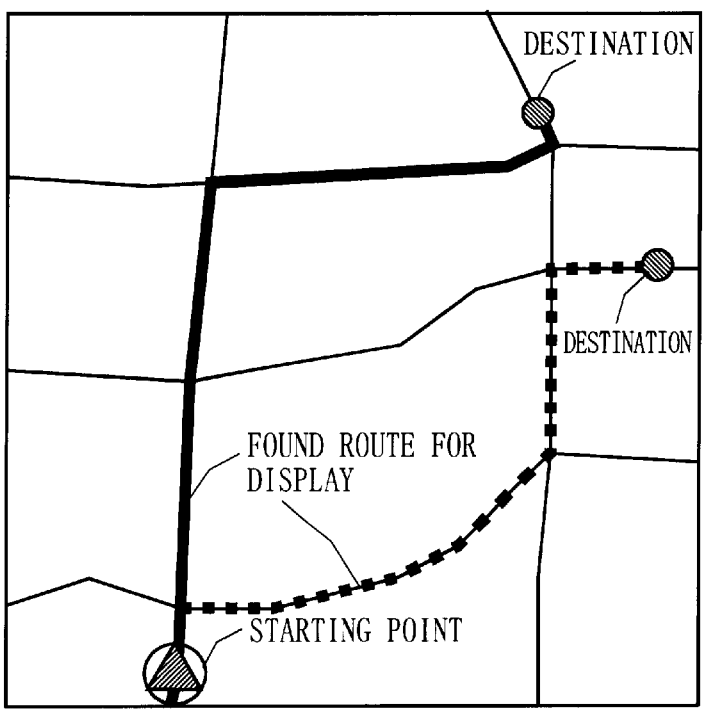
FIG. 13 is a diagram showing another example of a plurality of routes plurally found in step S205 of FIG. 2.

Also in the above, routes are plurally found from the starting point (departure point or the user's current position) to one destination in step S205. Alternatively, as shown in FIG. 13, the destination is not necessarily only one, and route options searched from the starting point (departure point or the user's current position) to several destinations may be displayed in step S207.

Figure 14:
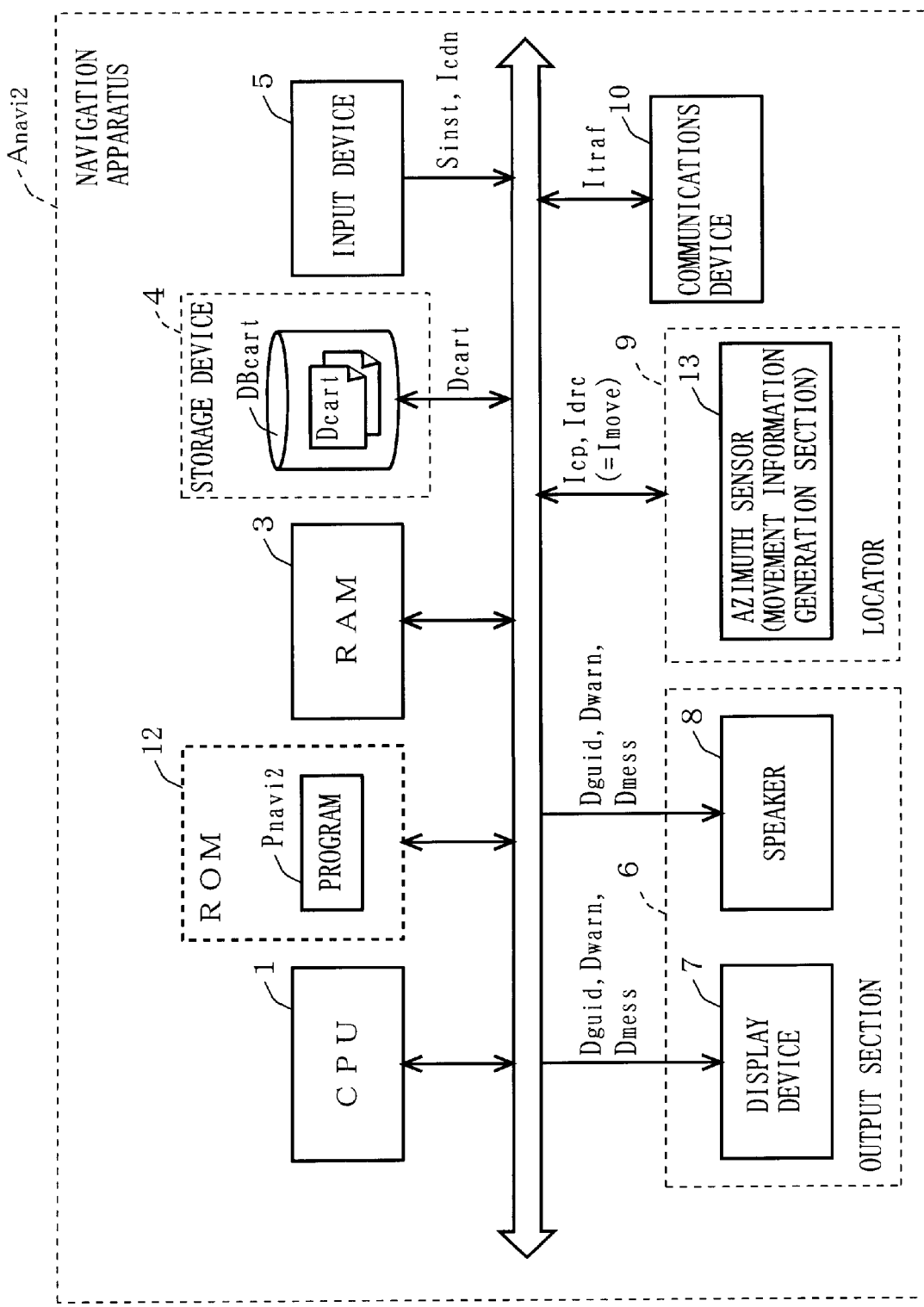
FIG. 14 is a block diagram showing the structure of a navigation apparatus Anavi2 according to a second embodiment of the present invention.

Described next is a navigation apparatus Anavi2 according to a second embodiment of the present invention. FIG. 14 shows the structure of the navigation apparatus Anavi2. Compared with FIG. 1, the navigation apparatus Anavi2 of FIG. 14 includes a ROM 12 as an alternative to the ROM 2, and the locator 9 further includes an azimuth sensor 13 in addition to the receiver in the first embodiment. These are the only differences, and in FIG. 14, any constituent identical to that in FIG. 1 is under the same reference numeral, and no further description is given here.

The ROM 12 is a program memory on which a program Pnavi2 for the navigation apparatus Anavi2 has been previously recorded.

The azimuth sensor 13 is also called a gyro sensor. The azimuth sensor 13 detects in which direction the user's vehicle is now heading, and generates direction information Idrc which indicates the detected direction. Thus generated direction information Idrc is transferred to the CPU 1.

Described next is the operation of the navigation apparatus Anavi2. After the navigation apparatus Anavi2 is turned on, the CPU starts executing the program Pnavi2 recorded on the ROM 12.

Figure 15:
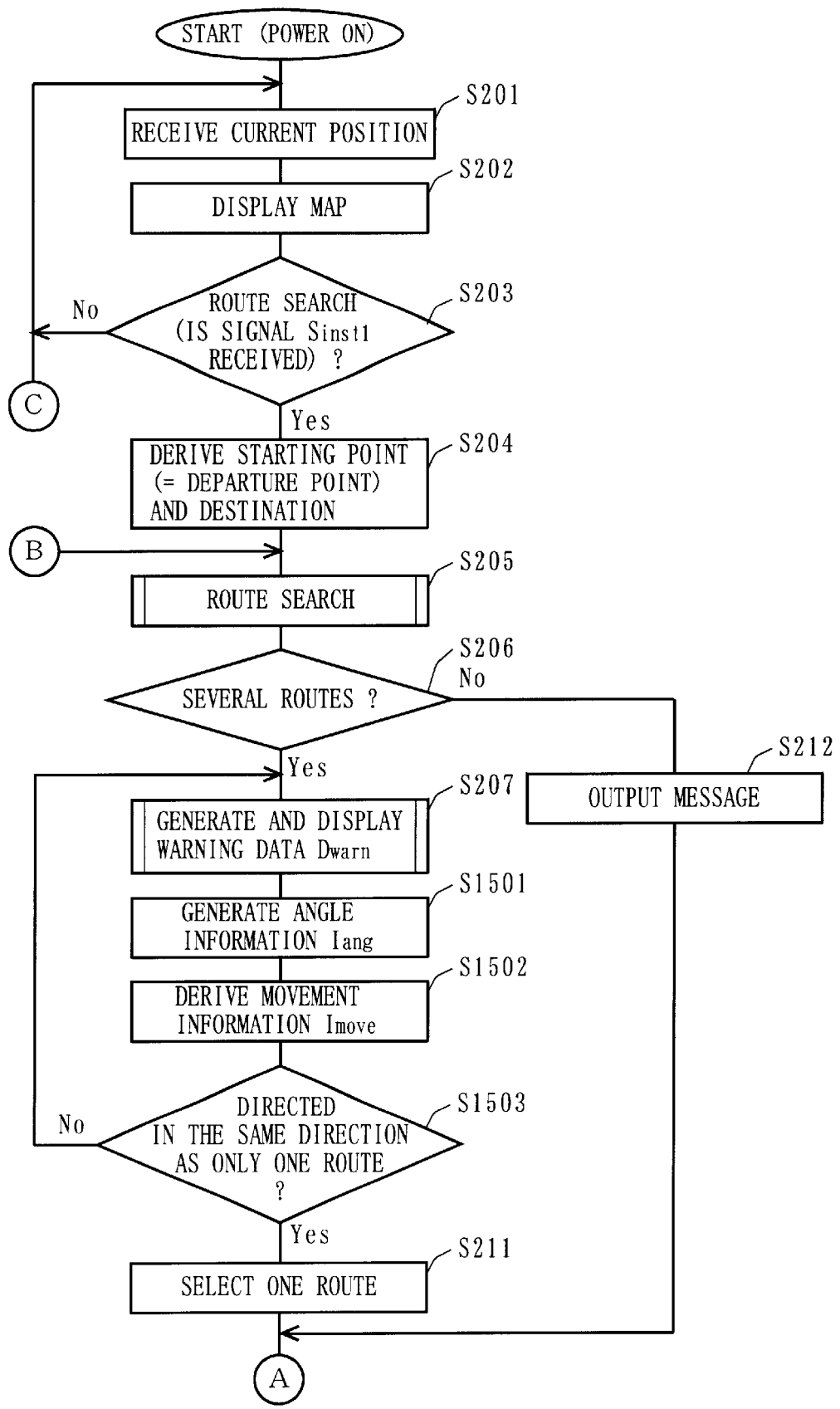
FIG. 15 illustrates the first half of a main flowchart showing the procedure of a CPU 1 of FIG. 14.

FIG. 15 is a flowchart showing the first half of the procedure of the CPU 1 written in the program Pnavi2. Here, the second half of the procedure in the program Pnavi2 shows no difference from that in FIG. 3, and thus is not described nor shown again. Compared with FIG. 2, FIG. 15 includes steps S1501 to S1503 in place of steps S208 to S210. This is the only difference therebetween, and in FIG. 15, any step identical to that in FIG. 2 is provided with the same step number and is not described again.

With several route options displayed to the user after step S207 in FIG. 15, the CPU 1 generates angle information Iang1 for the optimum route, and angle information Iang2 for the next-optimum route (step S1501).

Figure 16:
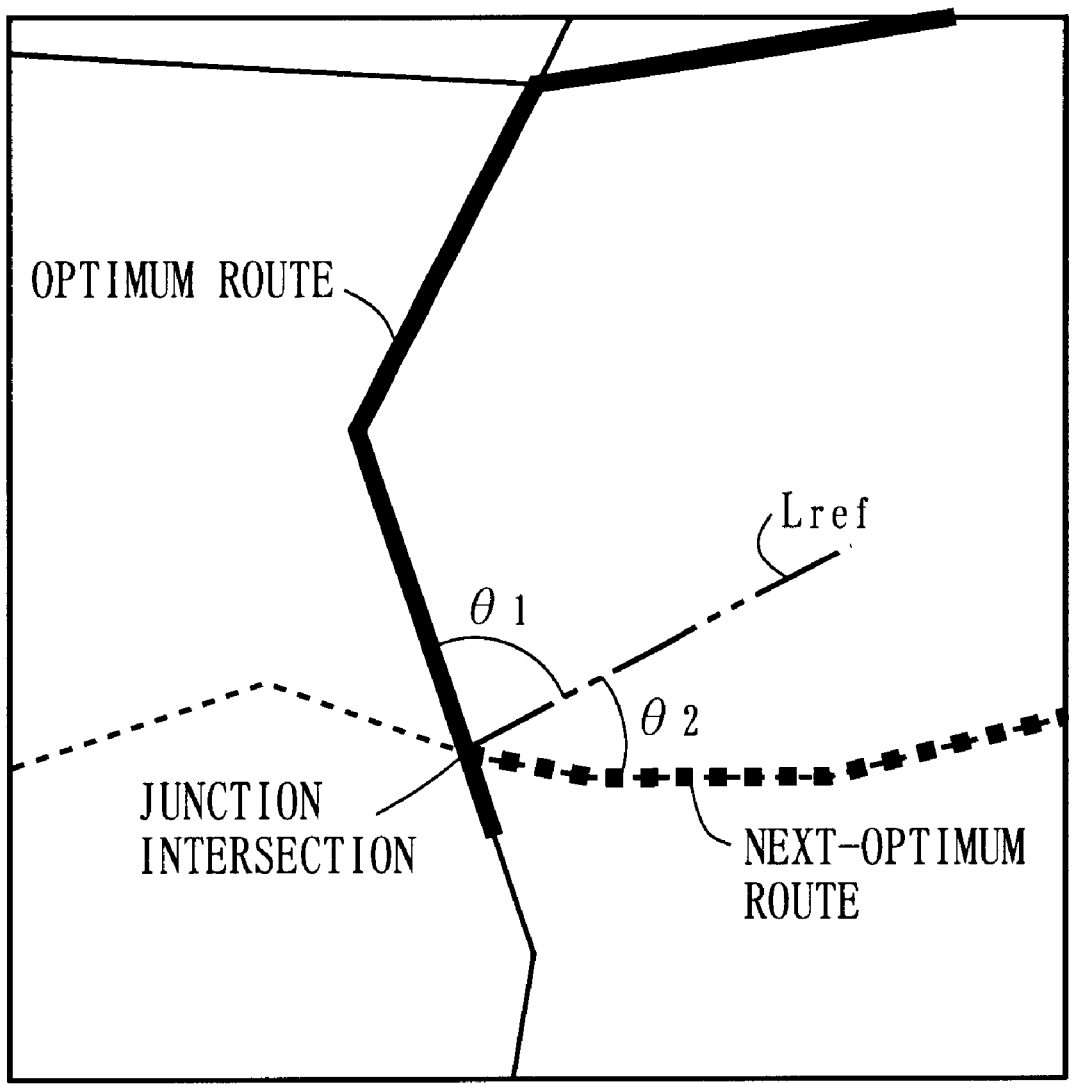
FIG. 16 is a diagram for illustrating angle information Iang1 and Iang2 generated in step S1501 of FIG. 15.

FIG. 16 is a diagram for illustrating the angle information Iang1 and Iang2. In FIG. 16, the program Pnavi2 previously defines a reference line Lref (see two-dotted line), which is a line started from a junction intersection (see first embodiment) towards a predetermined direction. In step S1501, the CPU 1 calculates an angle θ1 between the reference line Lref and the optimum route at the junction intersection, and retains the calculation result on the RAM 3 as the angle information Iang1. The CPU 1 also calculates an angle θ2 between the reference line Lref and the next-optimum route at the junction intersection, and retains the calculation result on the RAM 3 as the angle information Iang2.

After step S1501 is through, the CPU 1 instructs the azimuth sensor 13 to transfer the direction information Idrc as another example of the movement information Imove. In response, the azimuth sensor 13 generates the direction information Idrc indicating in which direction the user is now heading, and transfers it to the CPU 1. To be more specific, the direction information Idrc specifies the angle at which the user is heading with reference to the reference line Lref. At this time, the azimuth sensor 13 exemplarily works as the movement information generation section in claims. The CPU 1 receives such direction information Idrc from the azimuth sensor 13 as the movement information Imove (step S1502).

The CPU 1 then determines whether the direction in which the user's vehicle is now heading is practically the same as that of the optimum route or the next-optimum route (step S1503). More specifically, the CPU 1 compares the direction information Idrc received in step S1502 with the angle information Iang1 and Iang2 on the RAM 3 so as to determine whether the value of the direction information Idrc coincides with only either of the angle information Iang1 or Iang2.

If not, the CPU 1 determines that the user is not positioned on only one route, and the procedure returns to step S207 to continually display several routes to the user.

On the other hand, in step S1503, in the case that the value of the direction information Idrc coincides with one of the angle information Iang1 and Iang2, the CPU 1 determines that the user is now on only one route, i.e., optimum or next-optimum route, and accordingly selects the route (step S211).

Figure 3:
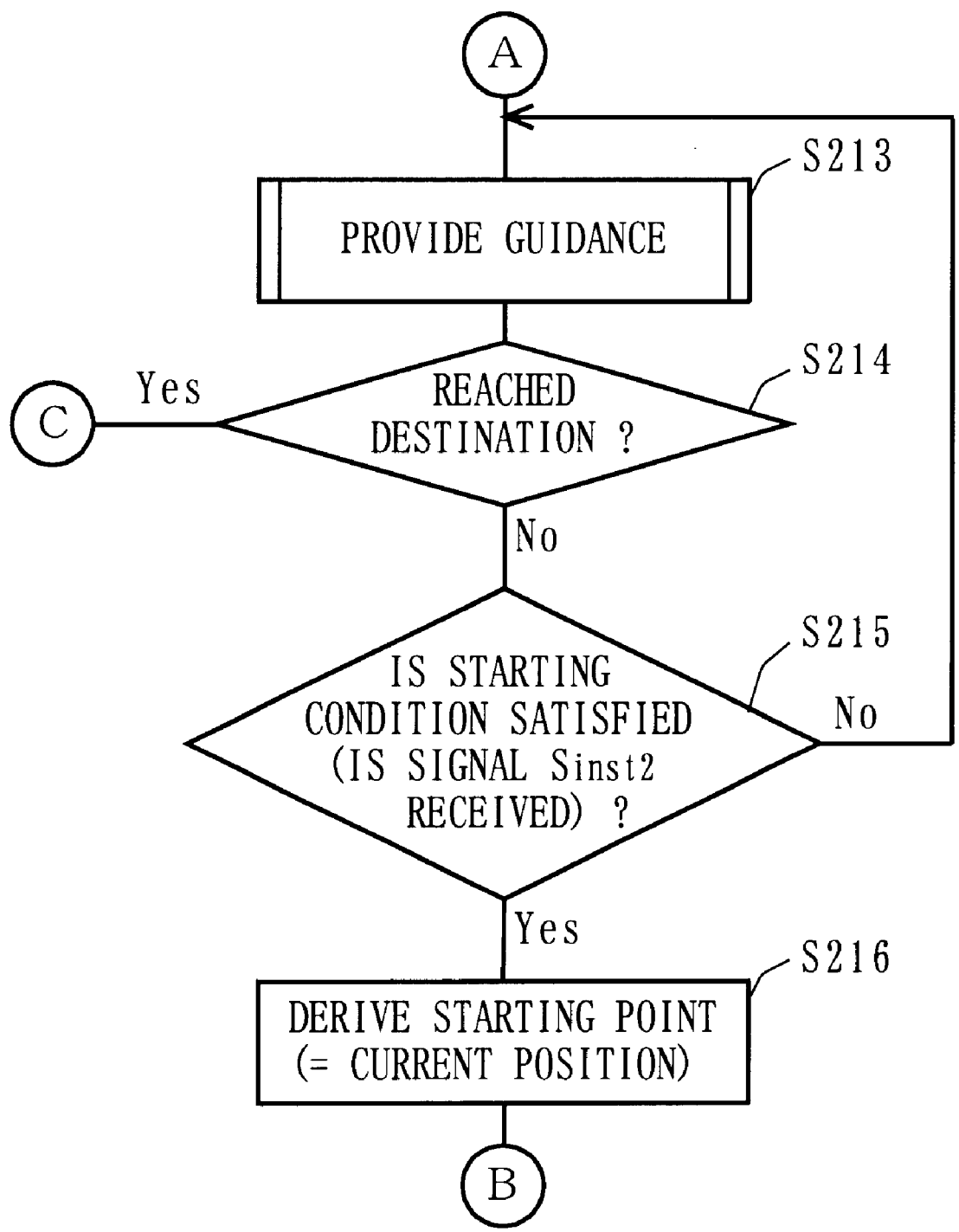
FIG. 3 illustrates the second half of the main flowchart showing the procedure of the CPU 1 of FIG. 1.

After step S211 is through, the procedure goes to step S213 of FIG. 3, i.e., circled letter A, and goes through the same process as described in the first embodiment.

As such, the navigation apparatus Anavi2 automatically selects one route from several others derived through route search on the basis of the user's movement, i.e., movement information Imove (direction information Idrc). Therefore, the navigation apparatus Anavi2 does not require the user cumbersome operation for route selection.

In the second embodiment, the CPU 1 has no need to obtain the direction information Idrc until the user reaches a junction intersection. Therefore, another step may be provided between steps S1501 and S1502 to determine whether the user has reached any junction intersection. The procedure may return to step S207 if not yet reached, and if reached, go to step S1502.

Figure 17:
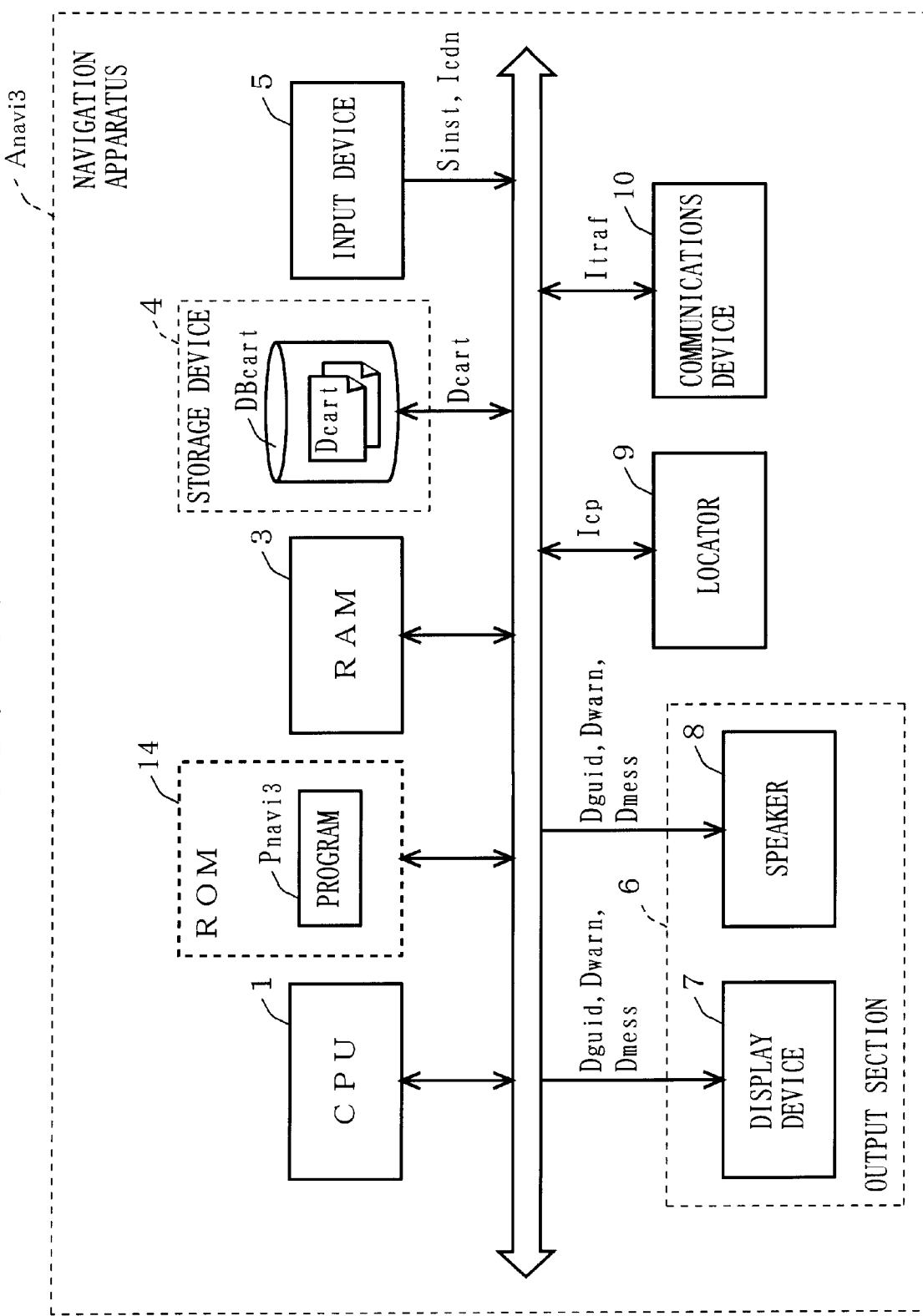
FIG. 17 is a block diagram showing the structure of a navigation apparatus Anavi3 according to a third embodiment of the present invention.

Described next is the structure of a navigation apparatus Anavi3 according to a third embodiment of the present invention. FIG. 17 is a diagram showing the structure of the navigation apparatus Anavi3. Compared with FIG. 1, the navigation apparatus Anavi3 includes a ROM 14 as an alternative to the ROM 2. This is the only difference, and in FIG. 17, any constituent identical to that in FIG. 1 is under the same reference numeral, and no further description is given.

The ROM 14 is a program memory on which a program Pnavi3 for the navigation apparatus Anavi3 has been previously recorded.

Described next is the operation of the navigation apparatus Anavi3. After the navigation apparatus Anavi3 is turned on, the CPU 1 starts executing the program Pnavi3 recorded on the ROM 14.

Figure 18:
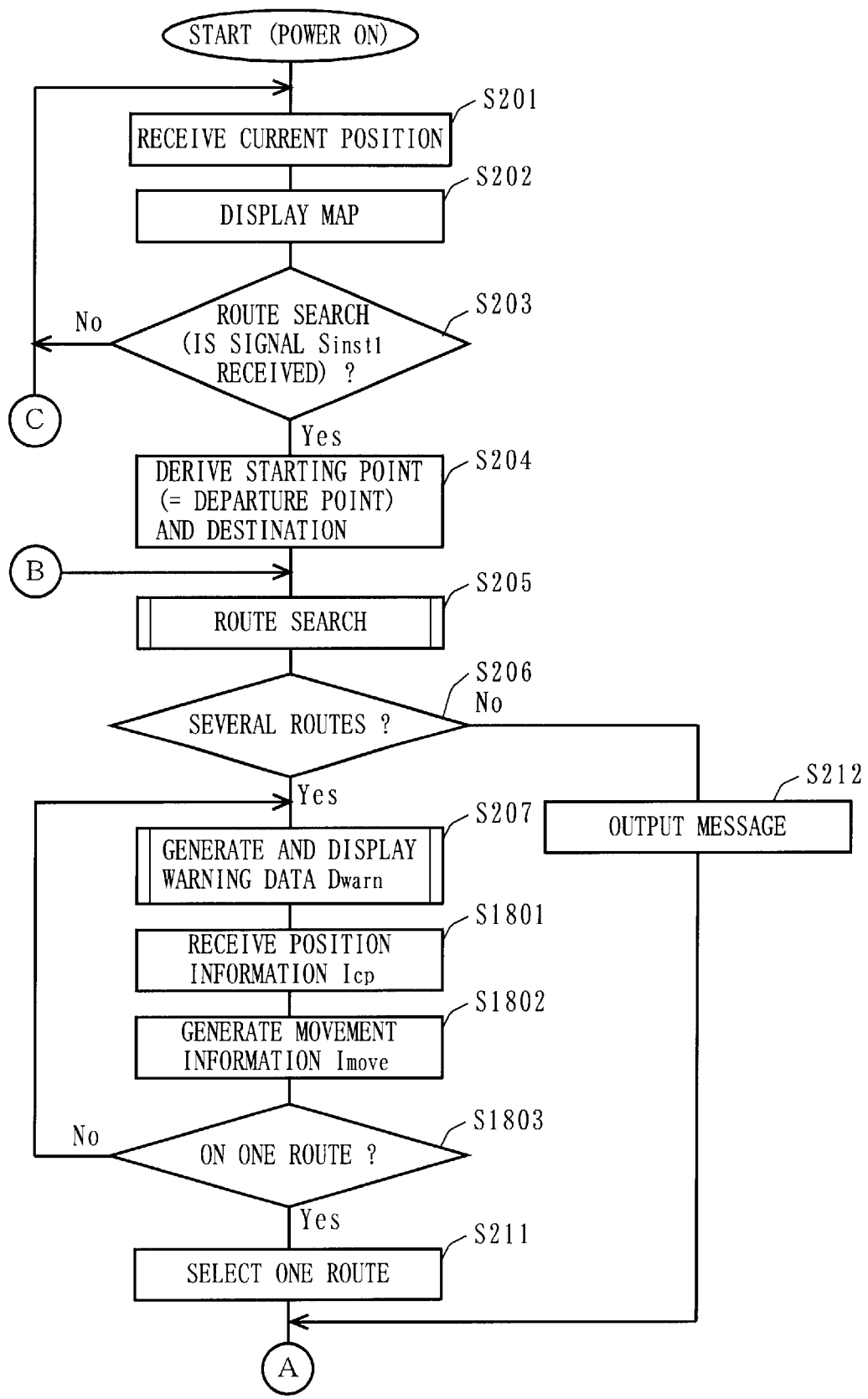
FIG. 18 illustrates the first half of a main flowchart showing the procedure of a CPU 1 of FIG. 16.

FIG. 18 is a flowchart showing the first half of the procedure of the CPU 1 written in the program Pnavi3. Here, the second half of the procedure in the program Pnavi3 shows no difference from that in FIG. 3, and thus is not described nor shown again. Compared with FIG. 2, FIG. 18 includes steps S1801 to S1803 in place of steps S209 to S211. This is the only difference therebetween, and in FIG. 18, any step identical to that in FIG. 2 is provided with the same step number and is not described again.

After step S207 is through, the CPU 1 receives the position information Icp from the locator 9 (step S1801). Then, the CPU 1 generates trail information Itraj as another example of the movement information Imove (step S1802). At this time, the CPU 1 works as a trail information generation section in claims. More specifically, every time in step S1802, the trail information Itraj is to be updated by being added with coordinate values of the position information Icp derived in step S1801. Thus, the trail information Itraj indicates the trail the user has moved so far, and is composed of the string of coordinate values indicated by several pieces of position information Icp.

The CPU 1 then determines whether or not the user's trail substantially coincides with only one route, i.e., optimum or next-optimum route (step S1803). To be more specific, in comparison among the trail information Itraj generated in step S1802, and the route data Droute11 and Droute12 on the RAM 3, the CPU 1 determines if the route specified by the trail information Itraj coincides with only either of the optimum route specified by the route data Droute11 or the next-optimum route specified by the route data Droute12.

If not in step S1802, the CPU 1 determines that the user is not being on one route so that the procedure returns to step S207 to continually display several routes for the user.

If yes in step S1802, the CPU 1 determines that the user is now being on one route, and accordingly selects the route on which the user currently is (step S211).

After step S211 is thorough, the procedure goes to step S213 of FIG. 3, i.e., circled letter A, and goes through the process in the same manner as the first embodiment.

As is understood from the above, the navigation apparatus Anavi3 automatically selects one route from several others derived through route search on the basis of the user's movement, i.e., movement information Imove (trail information Itraj). Therefore, the navigation apparatus Anavi3 does not require the user cumbersome operation for route selection.

In the first to third embodiments, the navigation apparatuses Anavi1 to Anavi3 are presumably of a vehicle-mounting type. This is not restrictive, and the navigation apparatuses Anavi1 to Anavi3 are easily realized in the portable application. Moreover, the programs Pnavi1 to Pnavi3 can be easily implemented in computer devices such as mobile phones, Personal Digital Assistants (PDAs), and personal computers, and accordingly those computer devices can be easily provided with the navigation function.

The programs Pnavi1 to Pnavi3 may be distributed in recording media typified by CDs, DVDs (Digital Versatile Disks), MO (Magnetic-Optical) disks, or semiconductor memories. Also, the programs Pnavi1 to Pnavi3 may be stored on the storage device of a network server so that the computer devices can download those programs therefrom.

FIG. 19 is a diagram showing the hardware structure of navigation apparatuses Anavi4 to Anavi6 according to fourth to sixth embodiments, respectively, of the present invention. In the below, when simply referred to as "navigation apparatus Anavi", it means all of the navigation apparatuses Anavi4 to Anavi6. In the present embodiment, the navigation apparatus Anavi is of a vehicle-mounting type, and includes a CPU 21, a ROM 22, a RAM 23, a storage device 24, an input device 25, an output section 26, a locator 29, and a communications device 210.

The ROM 22 is a program memory on which programs Pnavi4 to Pnavi6 for the navigation apparatuses Anavi4 to Anavi6, respectively, have been previously recorded. After the navigation apparatuses Anavi4 to Anavi6 are turned on, the CPU 21 starts executing the programs Pnavi4 to Pnavi6 in the ROM 22. During when the programs Pnavi4 to Pnavi6 are executed, the CPU 21 uses the RAM 23 as a working area.

The storage device 24 stores the cartographic database DBcart as does the storage device 4 in the first to third embodiments. The cartographic database DBcart may be of a known type, and composed of a collection of cartographic data Dcart included in one or more files. The cartographic data Dcart generally includes display data which is displayed as a map on a display device 27, and road network data which represents road connections on the map. Here, the map is the same as that in the first to third embodiments, and is not the same as the route diagram which will be described later. The road network data and the cartographic data Dcart are the same as those in the fist to third embodiments, and no further description is given here. As already described, the cartographic data Dcart includes the costs, i.e., the additional information Iaddi, are used at the time of route search (step S2005 in FIG. 20, and step S2010 in FIG. 21).

The input device 25 is the same as the input device 5 in the first to third embodiments, and thus is not described again. The output section 26 is typically composed of the display device 27 and a speaker 28. The locator 29 generates position information Icp which specifies the user's current position by coordinates. The position information Icp is then transferred to the CPU 21. The communications device 210 is in the same structure as the communications device 10 in the first to third embodiments, and no further description is given.

Described next is the operation of the navigation apparatus Anavi4 of the fourth embodiment. After the navigation apparatus Anavi4 is turned on, the CPU 21 starts executing the program Pnavi4 recorded on the ROM 22. Here, FIGS. 20 and 21 are flowcharts showing the procedure of the CPU 21 written in the program Pnavi4.

Figure 20:
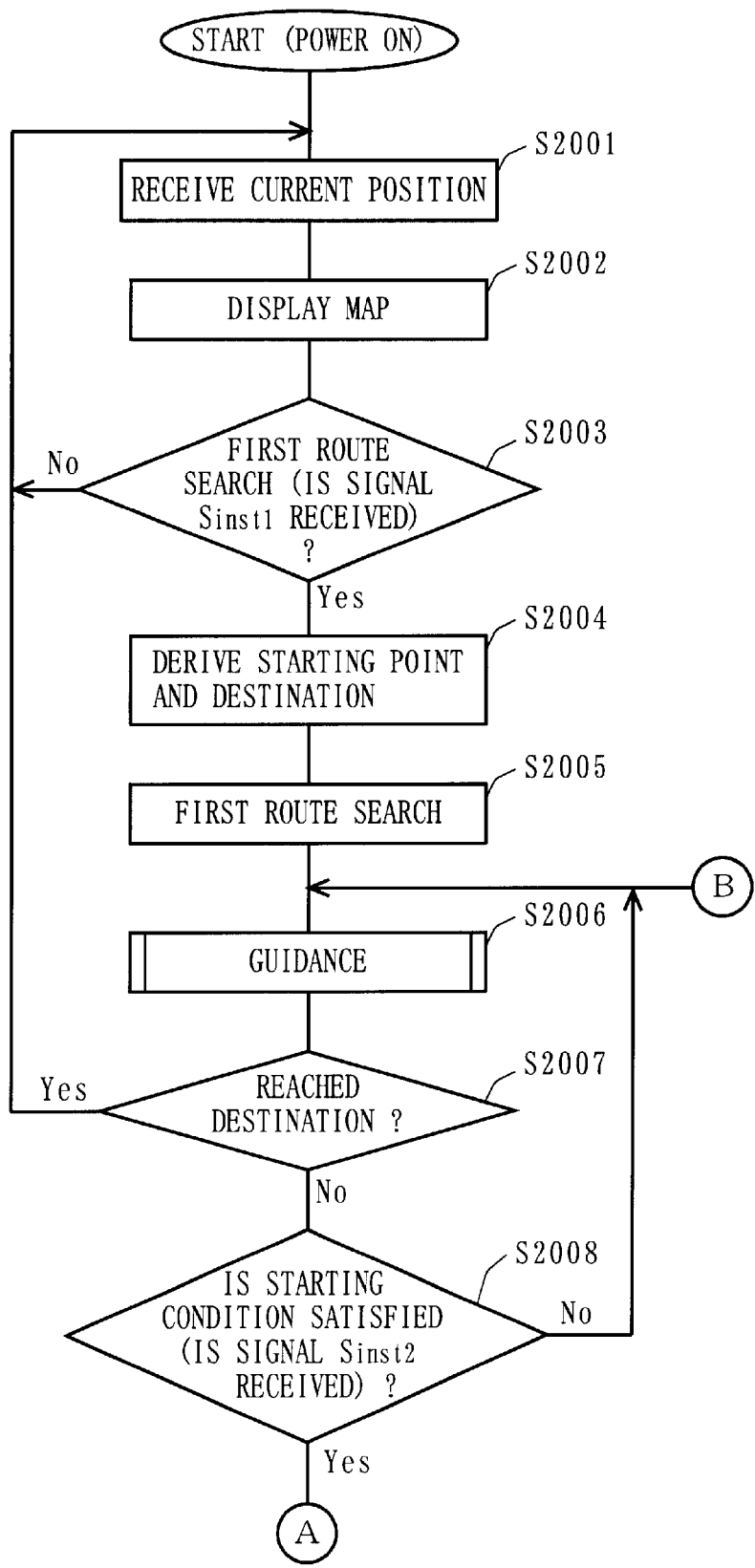
FIG. 20 illustrates the first half of a main flowchart showing the procedure of a CPU 21 of FIG. 19.
Figure 21:
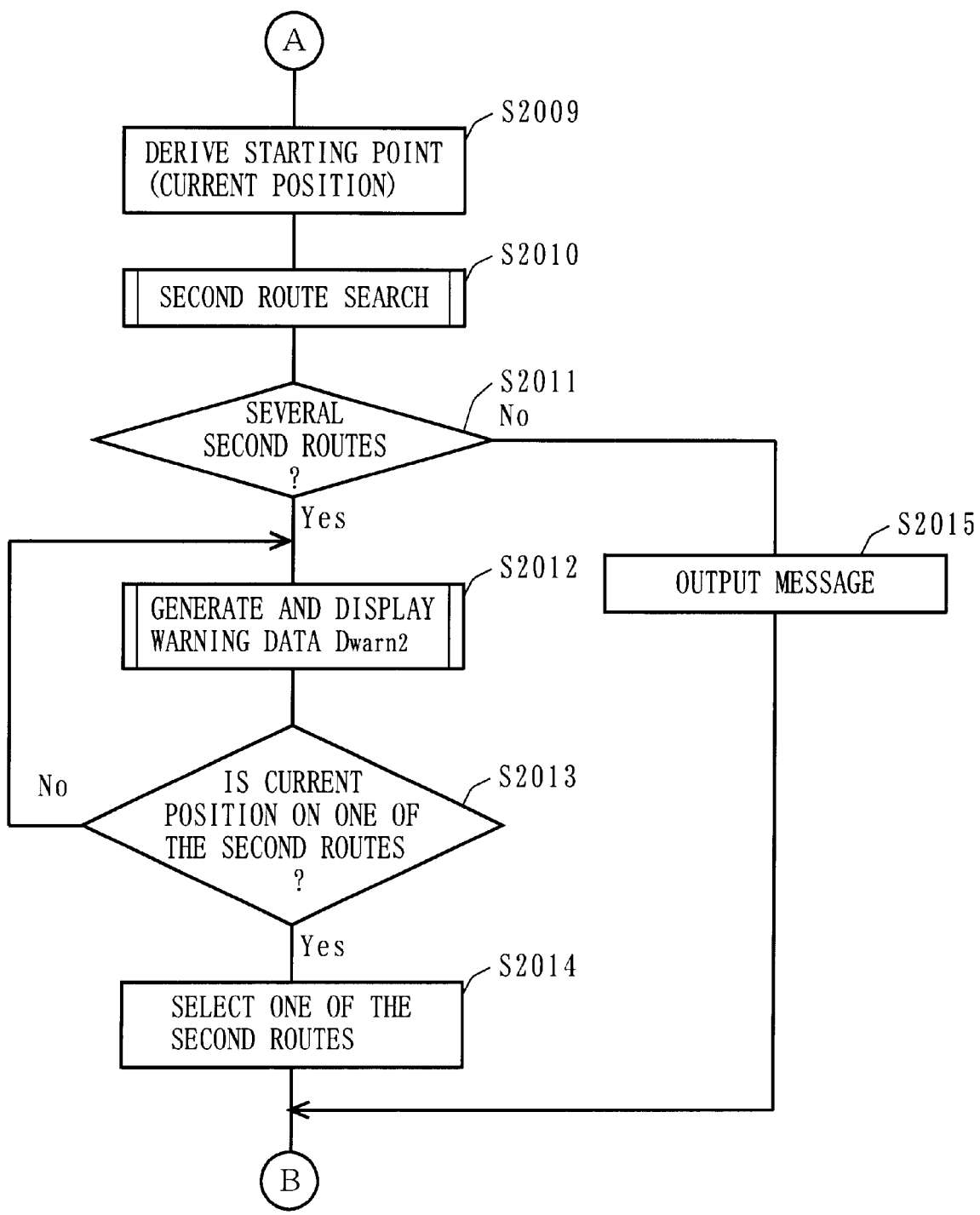
FIG. 21 illustrates the second half of the main flowchart showing the procedure of the CPU 21 of FIG. 19.

Referring to FIG. 20 first, the CPU 21 receives from the locator 29 the position information Icp indicating where the user currently is as in step S201 of FIG. 2 (step S2001). The CPU 21 operates similarly to step S202 of FIG. 2 so that the display device 27 displays a map including a mark overlaid on the position where the user is (see first embodiment)(step S2002). The CPU 21 determines whether or not to perform route search in the similar manner to step S203 of FIG. 2 (step S2003), and if no instruction signal Sinst1 has been received, the procedure returns to step S2001.

If the instruction signal Sinst1 has been received before step S2003, the CPU 1 determines that now is the time to perform route search for the first time (first route search), and the procedure goes to step S2004. The CPU 21 then derives both coordinates of a departure point and a destination for the first route search (step S2004). As a representative process in step S2004, the CPU 21 derives the coordinates of departure point and destination by decoding coordinates information Icdn generated and provided by the input device 25. Here, the coordinates information Icdn is the one specifying, by coordinates, the departure point and the destination inputted by the user via the input device 25.

As another specific example, in step S2004, the user may input only the destination through the input device 25. In response, the input device 25 generates the coordinates information Icdn for specifying the inputted destination by coordinates. The CPU 21 receives the resultant coordinates information Icdn, from which the coordinates of the destination are to be derived. The CPU 21 also receives from the locator 29 the position information Icp, from which the coordinates of the user's current position are to be derived. Thus derived coordinates of the user's current position is used as those of the departure point.

After step S2004 is thorough, the CPU 21 then performs the first route search under any well known route search algorithm, for example, Dijkstra's algorithm to find a first optimum route (step S2005). The process in step S2005 is the same as that in step S205 of FIG. 2, and is not described here. In the below, the "first optimum route" denotes a route taking the user from the current position toward the destination in the shortest distance or time, that is, the route with which the total cost Ctotal1 from the departure point toward the destination is minimum. After route search, the CPU 21 generates, on the RAM 23, route data Droute1 which indicates the first optimum route. The route data Droute1 is generally composed of a node string configuring the first optimum route. Here, the total cost Ctotal1 is written onto a predetermined region of the RAM 23 as required. Here, the total cost Ctotal1 is a value obtained by adding every cost assigned to all of the links configuring the first optimum route.

Figure 22:
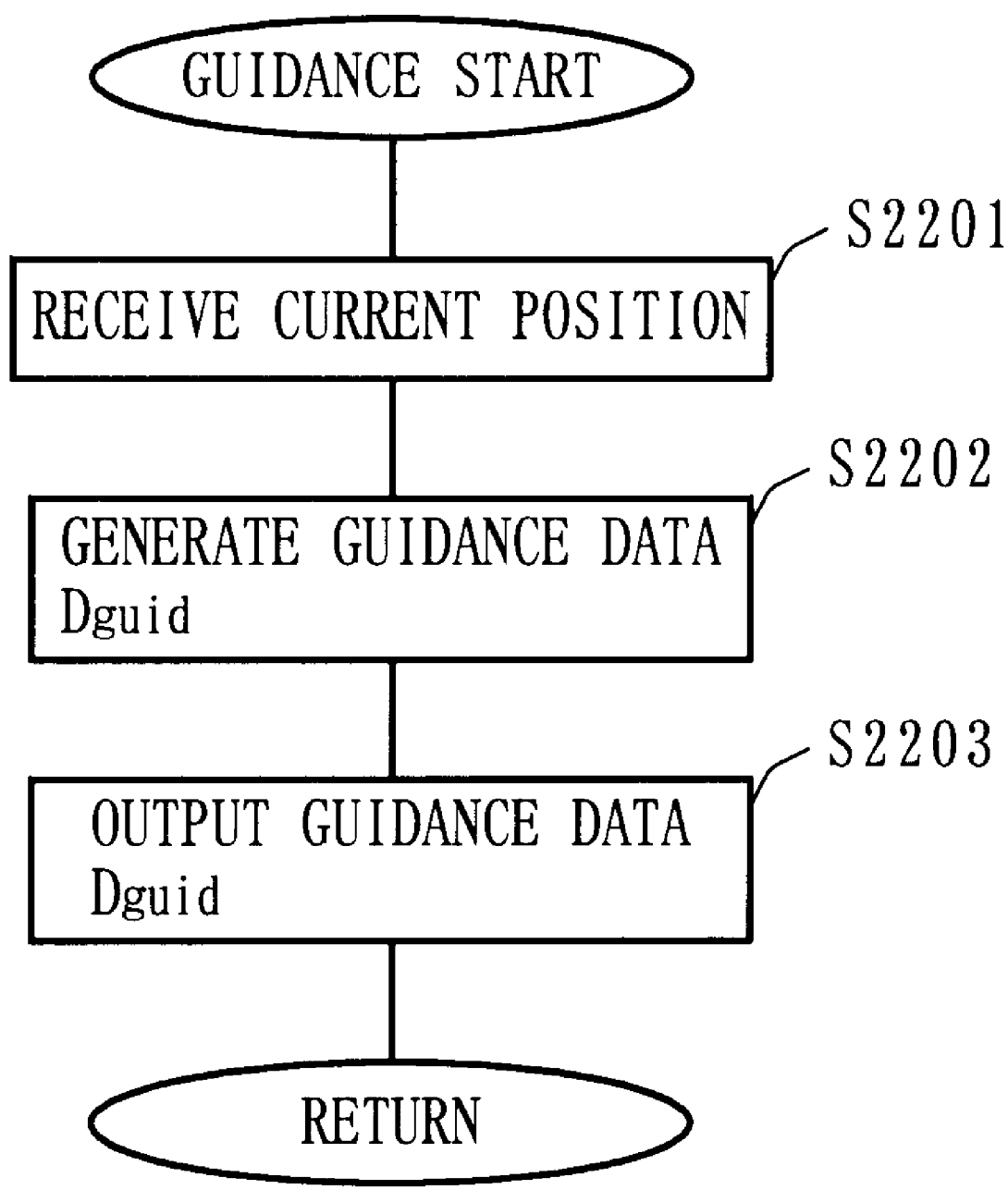
FIG. 22 is a flowchart showing the detailed procedure of guidance process (step S206) of FIG. 20.
Figure 23A:
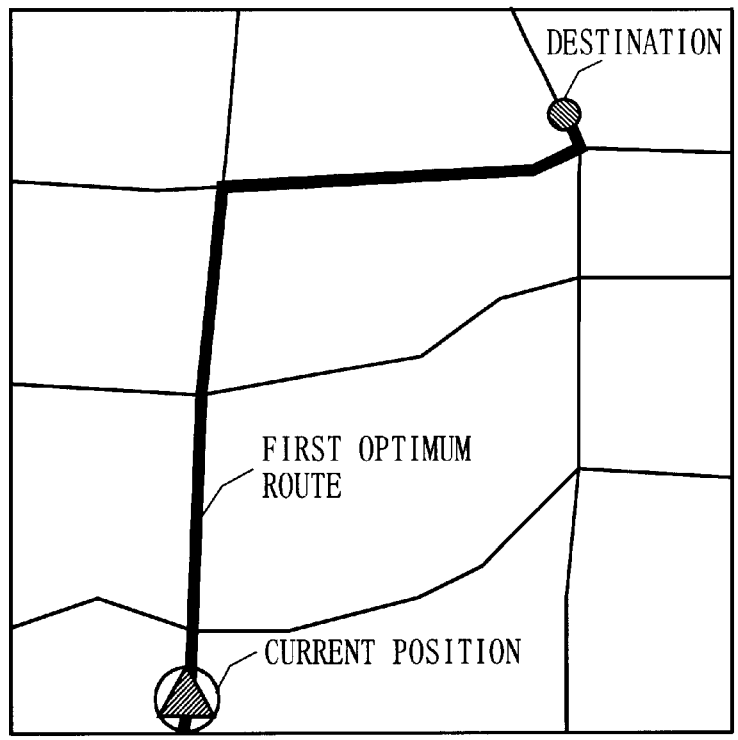
FIGS. 23A and 23B are diagrams each showing an exemplary screen of the display device 27 in the guidance process (step S206) of FIG. 20.

In step S2006, the CPU 21 guides the user's vehicle along the first optimum route derived in step S2005. Here, FIG. 22 is a flow chart showing the specific procedure in step S2006. In FIG. 22, the CPU 21 goes through the same process as in step S1101 of FIG. 11 so as to receive the position information Icp indicating the user's current position from the locator 29 (step S2201). Then, in the similar manner to step S1101 of FIG. 11, the CPU 21 generates guidance data Dguid on the RAM 23 (step S2202), and transfers it to the output section 26. In response to the guidance data Dguid, the output section 26 accordingly performs the display process in the display device 27, or the sound output process in the speaker 28 based on the guidance data Dguid. More specifically, the display device 27 performs the display process based on the image data included in the guidance data Dguid so as to display on its screen such an image as shown in FIG. 23A. In FIG. 23A, the screen of the display device 27 displays the user's current position, the destination, and the first optimum route overlaid together on the map. The speaker 28 outputs sound to the user based on the sound data in the guidance data Dguid (step S2203). Thereby, the CPU 21 guides the user toward the destination.

After step S2203 is through, the procedure goes to step S2007. Then, the CPU 21 compares the user's current position and the destination in terms of coordinates so as to determine whether or not the user has reached the destination (step S2007).

If the coordinates of the current position coincide with those of the destination, the CPU 21 determines that the user has reached the destination, and the procedure returns to step S2001. If not, the procedure goes to step S2008 to keep guiding the user. The CPU 21 then determines whether a predetermined condition is satisfied for starting route search for the second time (second route search)(step S2008). Here, the deciding factor in step S2008 is an instruction signal Sinst2 coming from the input device 25, and responding thereto, the CPU 21 starts the second route search. The input device 25 generates the instruction signal Sinst2 if the user operates a predetermined portion thereof assigned to start the second route search.

If no instruction signal Sinst2 has been received before step S2008, the procedure returns to step S2006 so that the user is guided continuously along the first optimum route. On the other hand, if received, the CPU 21 determines that now is the time to start the second route search, and the procedure goes to step S2009 of FIG. 21. The CPU 21 then derives the coordinates of the departure point (the user's current position) for the second route search (step S2009). More specifically, the CPU 21 receives the position information Icp from the locator 29 so that the user's current position can be specified by coordinates. The user's current position thus derived is used as the departure point for the second route search. Note that, in the second route search, the coordinates of the destination remain the same as those used in step S2004.

The CPU 21 then performs the second route search to find several of second routes under the route search algorithm (step S2010). Here, the second routes should vary in course on the way but share the same departure point and destination, which are those derived in step S2009. Also, the second routes should not coincide with the first optimum route. Such second routes include, for example, those taking the user to his/her destination in the shortest distance and the next-shortest distance, and in the shortest time and the next-shortest time. In the below, an expression "second optimum route" denotes a route taking the user from the current position toward the destination in the shortest distance or time, while an expression "second next-optimum route" in the next-shortest distance or time.

Figure 24:
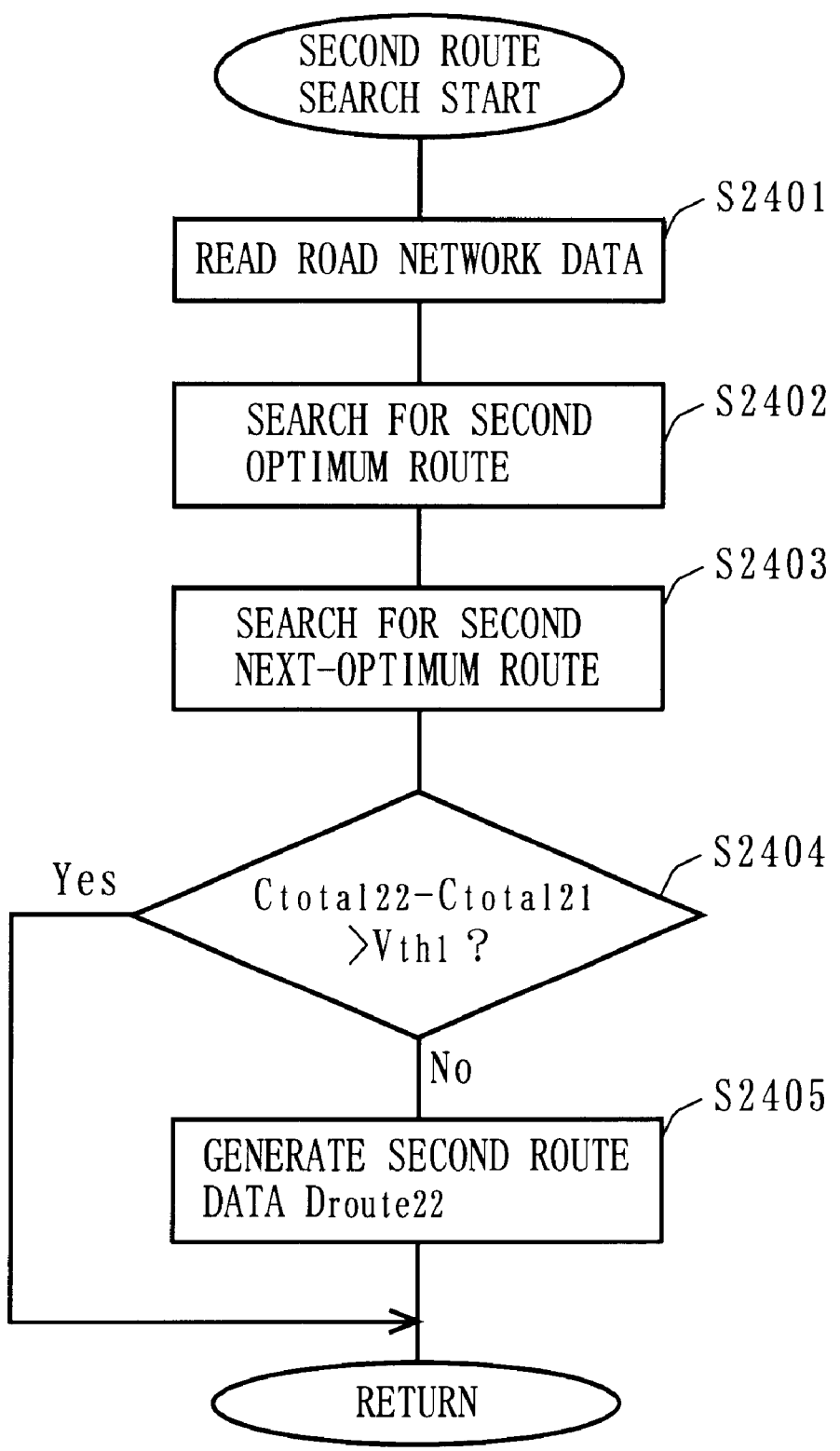
FIG. 24 is a flowchart showing the detailed procedure of second route search (step S210) of FIG. 21.

The second route search is described in more detail with reference to the flowchart of FIG. 24. In FIG. 24, from the cartographic database DBcart into the RAM 23, the CPU 21 first reads the road network data representing the road network of a predetermined area α4 (step S2401). Here, the predetermined area α4 typically is a rectangular region including both the user's current point and the destination derived in step S2009.

The CPU 21 then searches for one single second optimum route by using the road network data on the RAM 23 and the costs, i.e., additional information Iaddi, so as to generate, on the RAM 23, second route data Droute21 which represents the found second optimum route (step S2402). Here, the second route data Droute21 is typically composed of a node string configuring the second optimum route. In step S2402, a total cost Ctotal21 of the second optimum route is written onto the RAM 23. Here, the total cost Ctotal21 is a value obtained by adding every cost assigned to all of the links configuring the second optimum route.

In step S2402, it should be noted that the user is now guided along the first optimum route, that means, the user is now on the first optimum route. Accordingly, the route considered currently optimum from the user's current position toward the destination is the first optimum route, but in step S2402, there needs to find a second optimum route being different from the first optimum route. Thus, in the present embodiment, in order to search for a second optimum route, the cost for each of the links configuring the first optimum route derived in step S2005 is set larger this time, whereby a second optimum route can be successfully derived in step S2402 without coinciding with the first optimum route.

The CPU 21 then uses the road network data on the RAM 23 and the costs, i.e., additional information Iaddi, so as to search for the second next-optimum route (step S2403). Here, the second next-optimum route needs not to coincide with the first and second optimum routes, the cost for each of the links configuring the second optimum route derived in step S2402 is set larger this time, whereby any new route can be successfully derived in step S2403 without coinciding with the first and second optimum routes. Instep S2403, a total cost Ctotal22 of the second next-optimum route is written onto the RAM 23. Here, the total cost Ctotal22 is a value obtained by adding every cost assigned to all of the links configuring the second next-optimum route.

In some places, the difference in time or distance between the second optimum and second next-optimum routes may be quite large, and if so, the resultant second next-optimum route is considered not practical enough. In this point of view, after step S2403 is through, the CPU 21 determines whether or not the difference between the total costs Ctoal21 and Ctotal22 is exceeding a predetermined threshold value Vth1 (step S2404). Here, the threshold value Vth1 is determined according to the design specifications of the navigation apparatus Anavi4, and is criteria by which to judge whether the second next-optimum route is practical.

If the difference is exceeding the threshold value Vth1, the CPU 21 determines that no second next-optimum route has been derived, and the procedure now goes to step S2011 of FIG. 21. On the other hand, if not exceeding, the CPU 21 generates, on the RAM 23, route data Droute22 which represents the second next-optimum route derived in step S2403 (step S2405). The second route data Droute22 is typically composed of a node string configuring the second next-optimum route.

After step S2405 is through, the procedure goes to step S2011 of FIG. 21 so that the CPU 21 determines whether or not the second route is plurally derived in step S2010 (step S2011). This determination is based on whether the RAM 23 carries the second route data Droute21 only or together with the second route data Droute22.

If determined in step S2011 that only the second optimum route has been derived, the procedure goes to step S2015. The CPU 21 then generates warning data Dwarn1, and transfers it to the output section 26. The warning data Dwarn1 is image data or sound data, with which the user is notified in the form of a message that derived in step S2010 is only one single second route. In accordance with the received warning data Dwarn1, the output section 26 performs the display process in the display device 27, or the sound output process in the speaker 28 so as to output the message to the user (step S2015).

After step S2015 is through, the procedure goes to step S2006 of FIG. 20, i.e., circled letter B. The CPU 21 guides the user (step S2006 of FIG. 20). The process in step S2006 is the same as above, and thus not described again. It should be noted, however, used as the basis in this step S2006 is not the first optimum route derived in step S2005 but the second optimum route derived in step S2010.

On the other hand, if determined in step S2011 that several of the second routes have been derived, the procedure goes to step S2012 for a process of generating and displaying warning data Dwarn2 (step S2011). In the present embodiment, any one of the following first to fourth generation/display processes is performed in step S2011.

Figure 25:
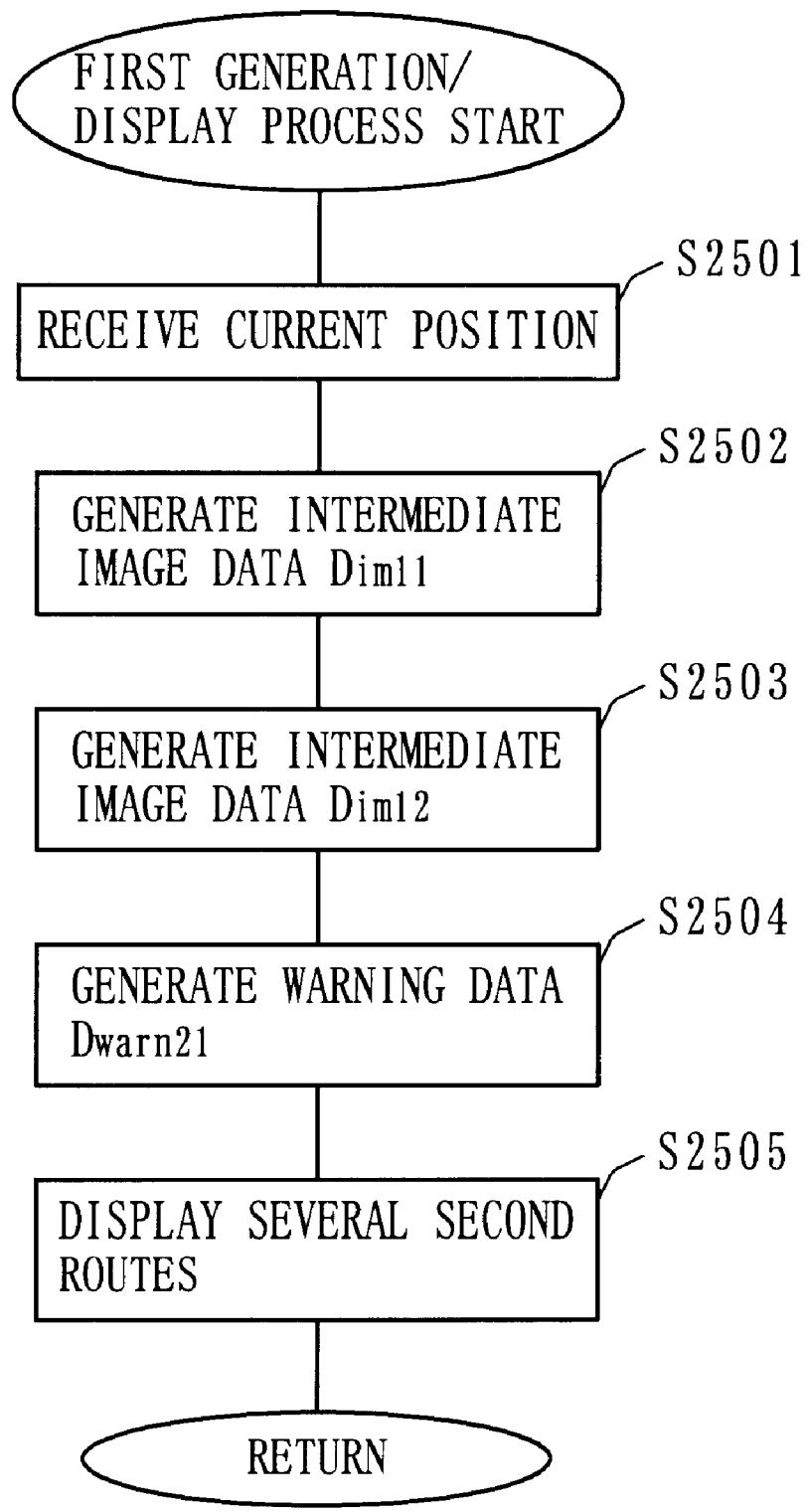
FIG. 25 is a flowchart showing a first generation/display process of warning data as an example of step S212 of FIG. 21.

The first generation/display process is now described in more detail by referring to the flowchart of FIG. 25. In the procedure of FIG. 25, used as the basis of the warning data Dwarn21 is a displaying portion of the cartographic data Dcart read out in step S2401.

In FIG. 25, the CPU 21 receives from the locator 29 the position information Icp indicating where the user currently is (step S2501). The CPU 21 then performs map matching by using both the position information Icp and the corresponding cartographic data Dcart so as to generate, on the RAM 23, intermediate image data Dim11 in which a mark denoting the user's current position is appropriately disposed on any corresponding road in the map (step S2502).

On the basis of the coordinates information Icdn about the destination used in step S2010 and the intermediate image data Dim11 generated in step S2502, the CPU 21 generates, on the RAM 23, intermediate image data Dim12 in which a mark denoting the destination is disposed on the map (step S2503).

Moreover, on the basis of the second route data Droute21 and Droute22 on the RAM 23, and the intermediate image data Dim12 generated in step S2503, the CPU 21 generates warning data Dwarn21 which enables the second optimum and second next-optimum routes to be displayed on the map (step S2504). Such warning data Dwarn21 allows the display device 27 to display the user's current position, the destination, and the second optimum and second next-optimum routes overlaid together on the map.

In step S2504, it is preferable if the warning data Dwarn21 displays the second optimum and second next-optimum routes in different colors or line styles on the map. With such warning data Dwarn21 displayed in step S2505, the user can distinguish the second optimum and second next-optimum routes easily which is which.

In step S2504, it is still preferable if the second optimum route is displayed in more noticeable color or line style than the second next-optimum route. Accordingly, the second optimum route looks conspicuous with the warning data Dwarn21 displayed, enabling the user to intuitively recognize it.

It should be noted that steps S2501 to S2504 can be carried out in any desired order, but step S2501 should be followed by step S2502.

Figure 23B:
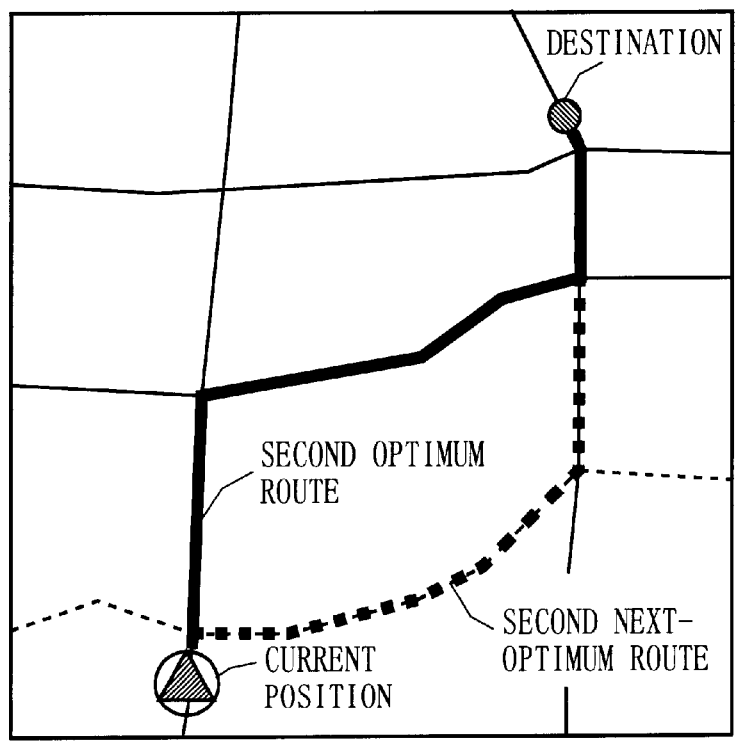

After step S2504 is through, the CPU 21 transfers the generated warning data Dwarn21 to the display device 27. The display device 27 performs the display process in accordance with the warning data Dwarn21 so as to display on its screen a map image having, at least, the second optimum and second next-optimum routes overlaid thereon. Such a map image is shown in FIG. 23B. Through the map image, the user sees several available second routes, i.e., second optimum and second next-optimum routes (step S2505). After step S2505, the procedure goes to step S2013.

Described next is the second generation/display process by referring to FIG. 26. Compared with FIG. 25, the procedure of FIG. 26 further includes steps S2601 to S2604. This is the only difference therebetween, and in FIG. 26, any step identical to that in FIG. 25 is under the same step number and not described again.

Figure 26:
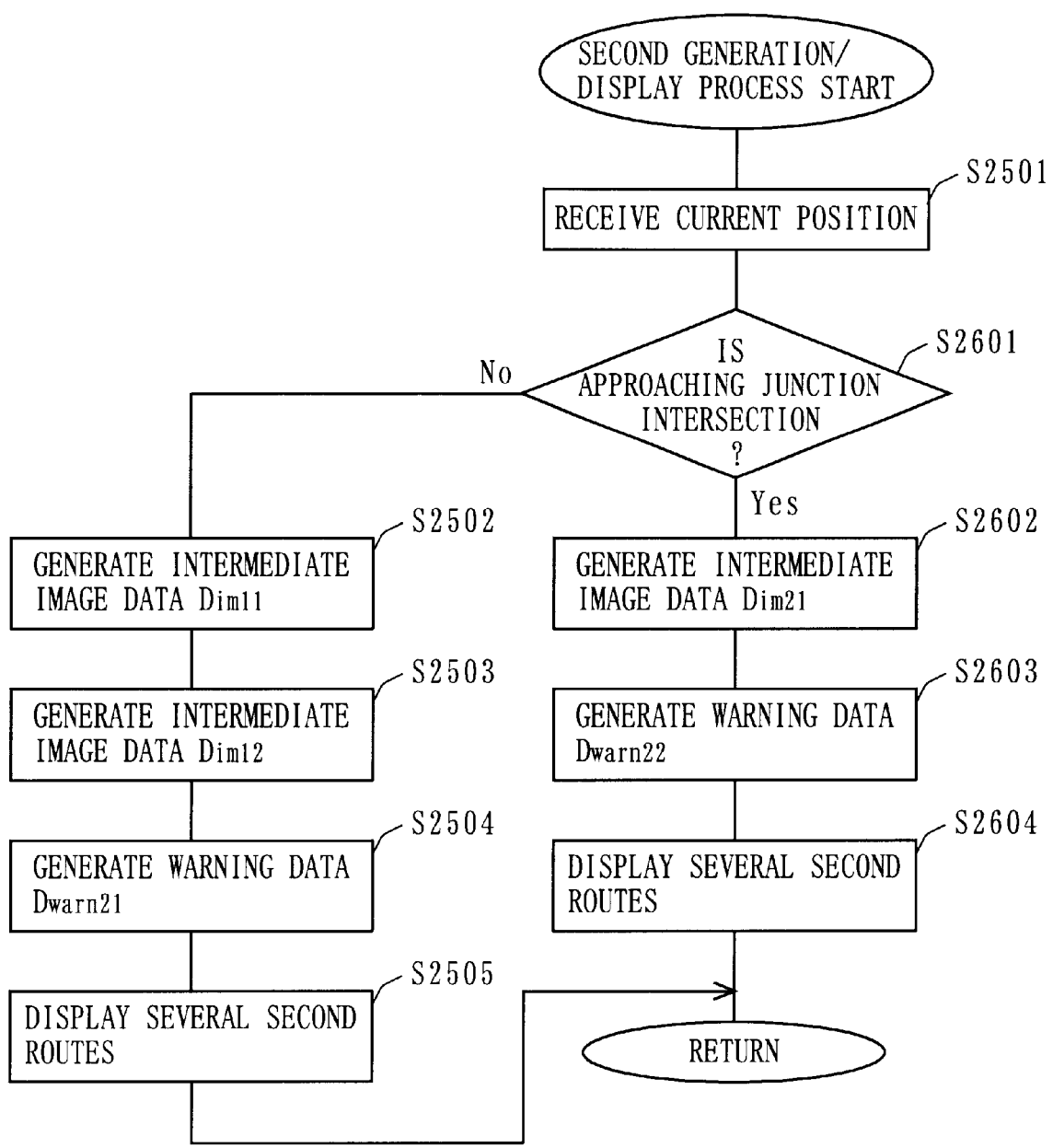
FIG. 26 is a flowchart showing a second generation/display process of warning data as another example of step S212 of FIG. 21.

In FIG. 26, after the CPU 21 receives the position information Icp (step S2501), the procedure goes to step S2601.

As is understood from FIG. 23B, the second optimum and second next-optimum routes share the same departure point and the destination, but vary in course on the way. The second optimum and second next-optimum routes thus head in different directions at a certain intersection. In the below, such an intersection is referred to as a junction intersection.

After step S2501 is through, in comparison between the second route data Droute21 and Droute22 in terms of node strings, the CPU 21 specifies, by coordinates, which node is the junction intersection (step S2601). Based on the coordinates of the node, i.e., junction intersection, and the coordinates indicated by the position information Icp, the CPU 21 determines whether or not the user is being close to the junction intersection (step S2601). More specifically, in step S2601, those coordinates are used to calculate the distance between the user's current position and the junction intersection, and the calculated value is compared with a predetermined threshold value Vth2. Here, the threshold value Vth2 is determined in advance according to the design specifications of the navigation apparatus Anavi4, and criteria by which to judge whether the user is approaching an intersection.

In step S2601, if determined that the user is approaching no junction intersection, steps S2502 to S2505 are carried out, and as a result, the user sees an image based on the warning data Dwarn21.

On the other hand, if determined that the user is approaching a junction intersection in step S2601, the procedure goes to step S2602. The CPU 21 then performs map matching by using the position information Icp and the corresponding cartographic data Dcart so as to generate, on the RAM 23, intermediate image data Dim21 in which a mark denoting the user's current position is appropriately overlaid on any corresponding road in the map (step S2602). Note herein that the cartographic data Dcart used in step S2602 represents an enlarged map covering the area around the junction intersection. In this sense, steps S2602 and S2502 are not the same.

Then, on the basis of the second route data Droute21 and Droute22 derived in step S2010, and the intermediate image data Dim21 generated in step S2602, the CPU 21 generates warning data Dwarn22 in which roads around the junction intersection on the second optimum and second next-optimum routes are arranged on the map (step S2603). More specifically, the warning data Dwarn22 is image data which allows the display device 27 to display the user's current position, and the second optimum and second next-optimum routes overlaid all together on an enlarged map of around the junction intersection.

In step S2603, it is preferable if the second optimum and second next-optimum routes are displayed in different colors or line styles. It is still preferable if the second optimum route is displayed in more noticeable color or line style than the second next-optimum route. Moreover, steps S2603 and S2604 may be switched in order.

Figure 27A:
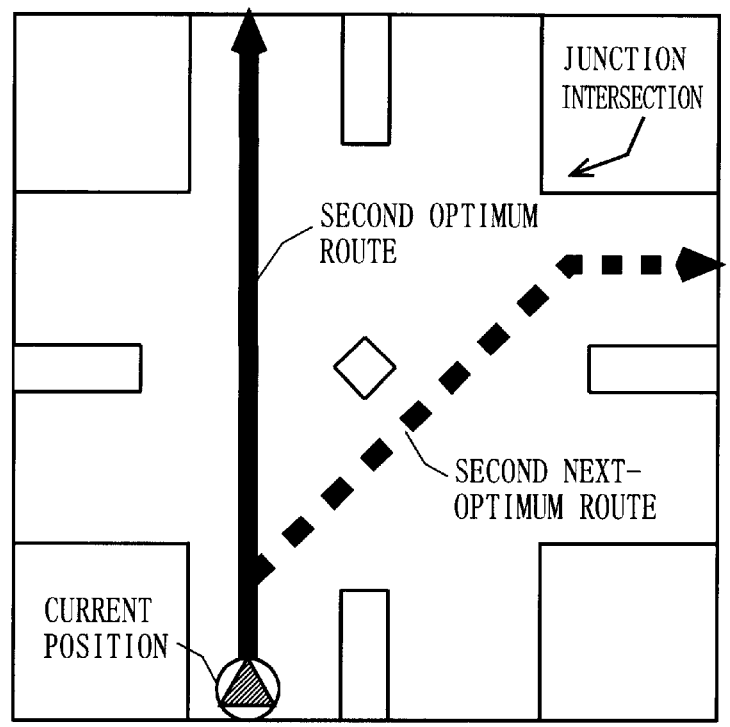
FIG. 27A is a diagram showing the result of a display process subjected to warning data Dwarn22 in step S2604 of FIG. 26.

After step S2603 is through, the CPU 21 transfers the generated warning data Dwarn22 to the display device 27. The display device 27 performs the display process based on the warning data Dwarn22 so as to display on its screen such an image as shown in FIG. 27A. The image shows at least the second optimum and second next-optimum routes overlaid on the enlarged map of around the junction intersection. With such an image, the user can easily perceive the specific location where several routes, i.e., second optimum and second next-optimum routes, are branched (step S2604). After the image is displayed, the procedure goes to step S2013.

Figure 28:
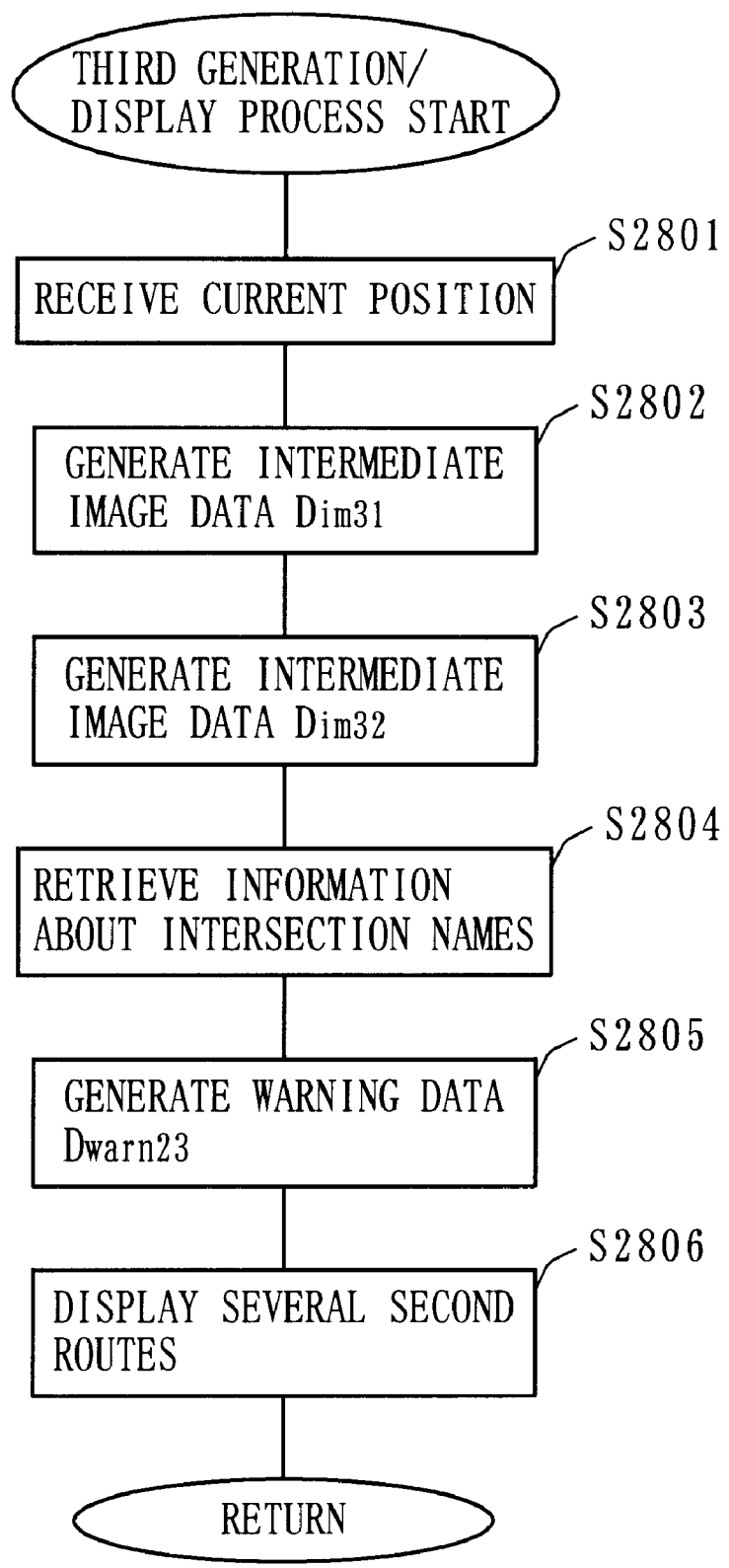
FIG. 28 is a flowchart showing a third generation/display process of warning data as still another example of step S212 of FIG. 21.

Described next is the third generation/display process with reference to the flowchart of FIG. 28. In FIG. 28, the CPU 21 receives from the locator 29 the position information Icp indicating where the user currently is (step S2801). Then, the CPU 21 generates intermediate image data Dim31 by using background image data Dbg1 and the received position information Icp (step S2802). Here, the background image data Dbg1 has been previously at hand, and represents the background of the image displayed in step S2806. The intermediate image Dim31 shows the user's current position, which is indicated by the position information Icp, by a mark overlaid on the background image of the background image data Dbg1.

Based on the coordinates information Icdn about the destination used in step S2010, and the intermediate image data Dim31 generated in step S2802, the CPU 21 generates intermediate image data Dim32 having another mark overlaid on the background image to indicate the destination (step S2803).

The CPU 21 reads, from the cartographic database DBcart, the additional information Iaddi for whatever intersection names in need (step S2804). To be more specific, read in step S2804 are names of the main intersections found in the second route data Droute21 and Droute22, i.e., located on the second optimum and second next-optimum routes.

On the basis of the additional information Iaddi read in step S2804 and the intermediate image data Dim32 generated in step S2803, the CPU 21 disposes the intersection names onto the background image, and then generates warning data Dwarn23 on the RAM 23 by connecting those names by lines so that the second optimum and second next-optimum routes are represented thereby (step S2805). In more detail, the warning data Dwarn23 allows the display device 27 to display a route diagram, in which several major intersections located on several second routes are connected by lines.

In step S2805, similarly in step S2503, the second optimum route is preferably displayed in different color or line style from the second next-optimum route. Further, the color or line style of the second optimum route preferably looks conspicuous than that of the second next-optimum route.

It should be noted here that steps S2801 to S2805 can be carried out in any desired order, but step S2801 should be followed by step S2802.

Figure 27B:
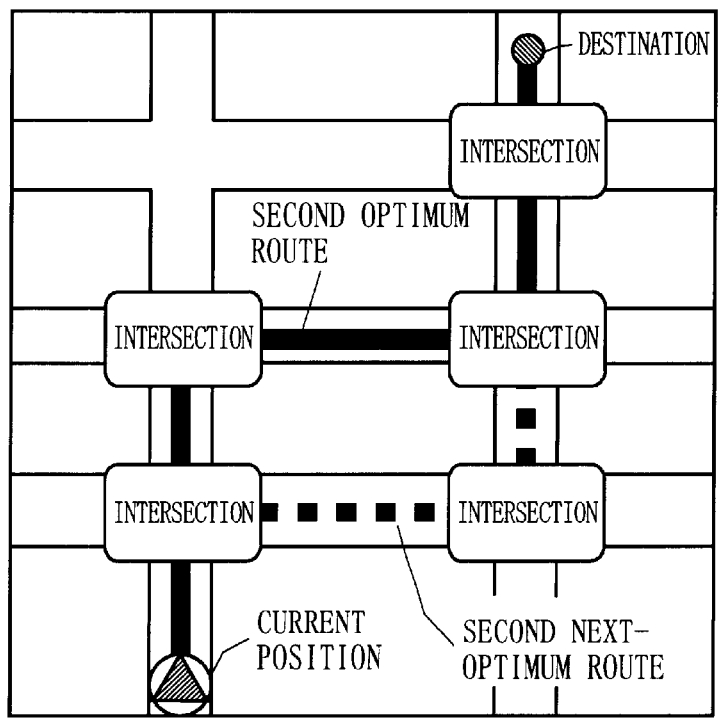
FIG. 27B is a diagram showing the result of the display process subjected to warning data Dwarn23 in step S2806 of FIG. 28.

After step S2805 is through, the CPU 21 transfers the generated warning data Dwarn23 to the display device 27. The display device 27 performs the display process based on the received warning data Dwarn23 so as to display on its screen such a route diagram as shown in FIG. 27B. With such a route diagram displayed, the user can perceive what second route(s) are available, i.e., second optimum and second next-optimum routes (step S2806). After step S2806 is through, the procedure goes to step S2013 of FIG. 21.

Figure 29:
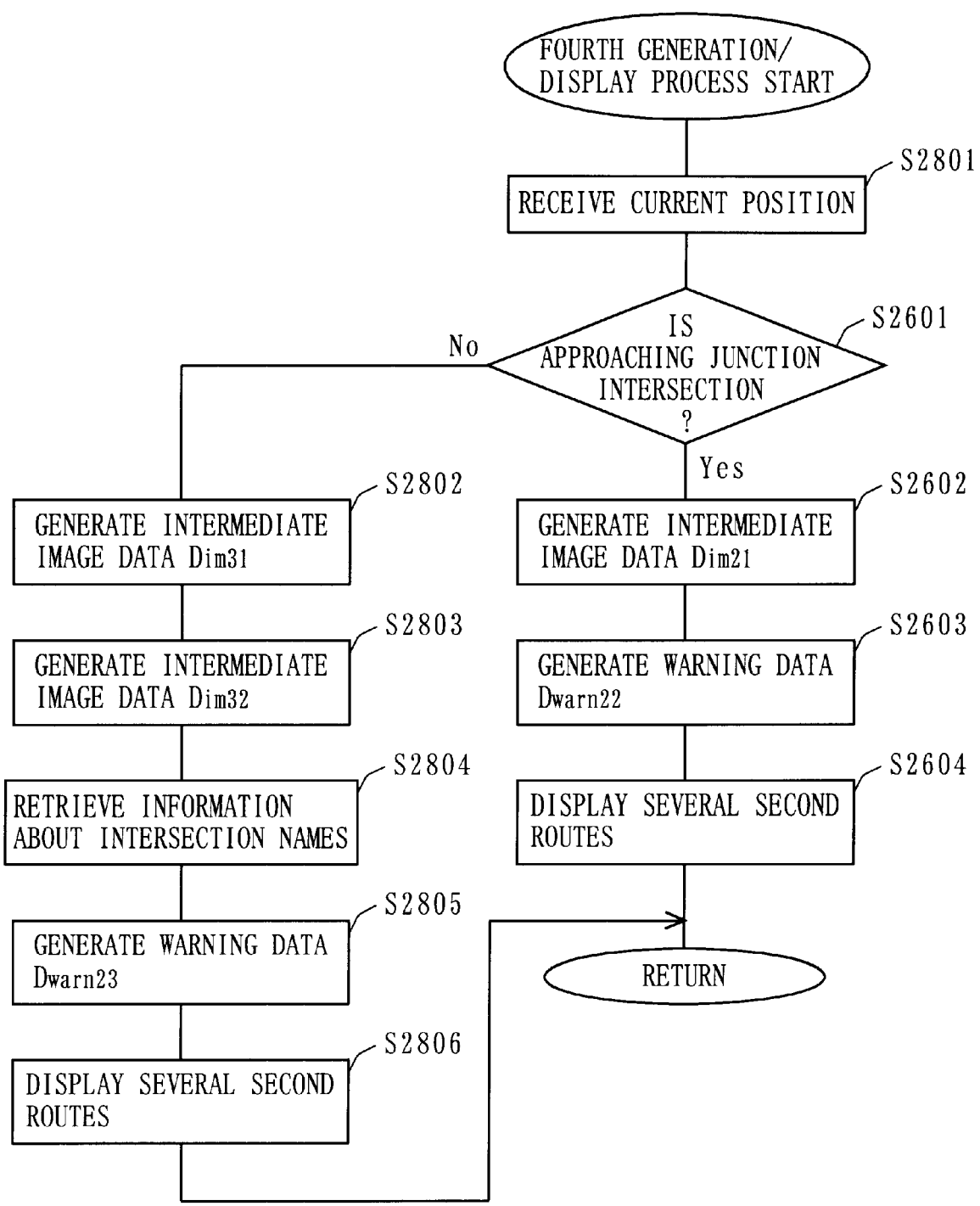
FIG. 29 is a flowchart showing a fourth generation/display process of warning data as still another example of step S212 of FIG. 21.

Described next is the fourth generation/display process by referring to FIG. 29. Compared with FIG. 28, the procedure of FIG. 29 further includes steps S2601 to S2604. This is the only difference therebetween, and in FIG. 29, any step identical to that in FIG. 28 is under the same step number and not described again. Also, steps S2601 to S2604 are already described in the second generation/display process, and thus not described in detail here.

Also under the fourth generation/display process, the user can easily perceive the exact location where the second routes, i.e., second optimum and second next-optimum routes, are heading in each different direction. After step S2604 is through, the procedure goes to step S2013 of FIG. 21.

By the time when step S2012 has been through, several of second routes will be available for the user to select one from those. In the present embodiment, preferably, the CPU 21 can automatically perform route selection by monitoring the user's (i.e., the vehicle's) actual movement without the user having to operate the input device 25. In the below, an exemplary method for selecting one single second route is described.

The CPU 21 determines whether or not the user's vehicle is now positioning on any one of the second routes (step S2013). In detail, the CPU 21 performs map matching by using the cartographic data Dcart on the RAM 23 and the position information Icp received from the locator 29. As is well known, map matching is done to bring the user's current position to the corresponding road on the map. Thus, the result of map matching tells the CPU 21 on which of the second optimum and second next-optimum routes the user is now moving.

If the CPU 21 determines that the user is positioning on both of the second optimum and second next-optimum routes, the procedure returns to step S2012 so that several of the second routes are continually displayed to the user.

On the other hand, if the CPU 21 determines that the user is positioning on one of the second routes, i.e., second optimum or next-optimum route, the route is accordingly selected (step S2014). Then, the procedure goes to step S2006 of FIG. 20, i.e., circled letter B.

Actually, the user may be on none of the second routes. If this is the case, with no relation to the present embodiment, no description is given here.

After step S2014, the CPU 21 guides the user (step S2006 of FIG. 20). The process in step S2006 is the same as above, and thus not described again. It should be noted, however, used as the basis in this step S2006 is not the first optimum route derived in step S2005 but either the second optimum route or the second next-optimum route selected in step S2014.

As described above, in the present embodiment, the navigation apparatus Anavi4 can start searching for second routes if any predetermined starting condition is satisfied (step S2008) during when the apparatus is guiding the user along the first optimum route. Accordingly, with the navigation apparatus Anavi4, the user has no more need to go off the first optimum route to know what other route options, i.e., second routes, are available. Further, since the second route is plurally found in step S2010, a wider range of route choices can be offered to the user to select therefrom whatever detour route meeting his/her preferences or actual traffic conditions.

In the fourth embodiment, the display device 27 applies the display process according to the warning data Dwarn21 to Dwarn23 so that second optimum and second next-optimum routes are offered to the user. Alternatively, the CPU 21 may generate warning data Dwarn2v, and transfer it to the speaker 28 to have the speaker 28 performed the audio output process in accordance therewith so as to provide the user with second optimum and second next-optimum routes by sound. Here, the warning data Dwarn2 may be outputted from the output section 26 in the form of image or sound.

Also in the fourth embodiment, the warning data Dwarn21 to Dwarn23 are image data enabling at least the second optimum and second next-optimum routes to be displayed. Alternatively, by using the following additional information Iaddi, the CPU 21 may generate warning data Dwarn21' to Dwarn26' which allow such images as shown in FIGS. 30 and 31 to be displayed.

Here, the additional information Iaddi needed for generating the warning data Dwarn21' to Dwarn26' is prepared in advance, and together with the information about intersection names and the costs, expected to include attribute information about roads represented by links. Here, typically, the attribute information is exemplary of road type information, road name information. With the road name information, the roads may be represented as Route X, Expressway Y, for example. The additional information Iaddi is also expected to include toll information used to calculate toll for toll roads.

Figure 30A:
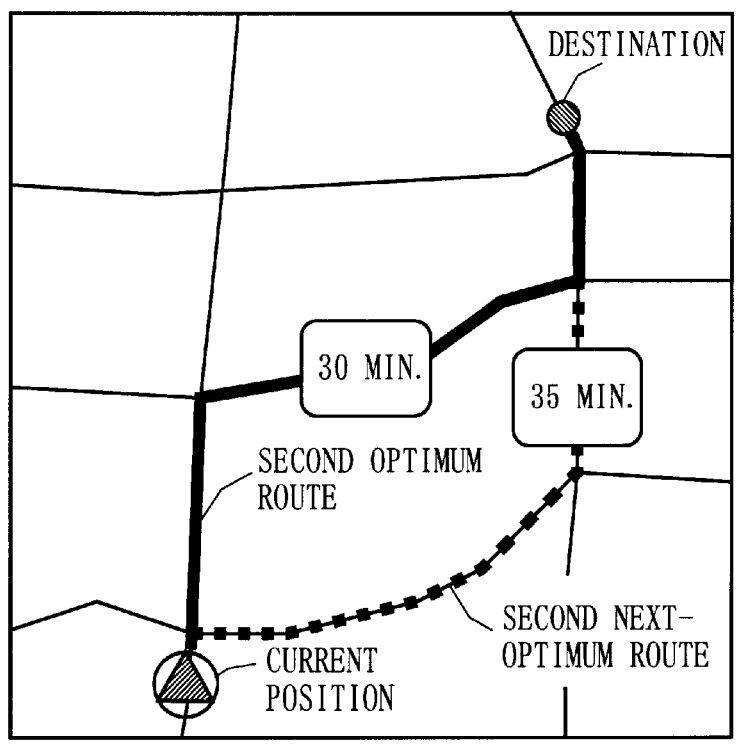
FIGS. 30A and 30B are diagrams showing warning data Dwarn21' and Dwarn22', respectively, which are generated by the CPU 21 of FIG. 19 and displayed on the screen of the display device 27.

As shown in FIG. 30A, the warning data Dwarn21' is image data which allows the display device 27 to display on the map the time required for the user to reach the destination if he/she takes the second optimum route or the second next-optimum route. Here, image elements for indicating such a time can be generated from the total cost Ctotal21 or Ctotal22. Alternatively, the time may be displayed on the route diagram or the enlarged map.

Figure 30B:
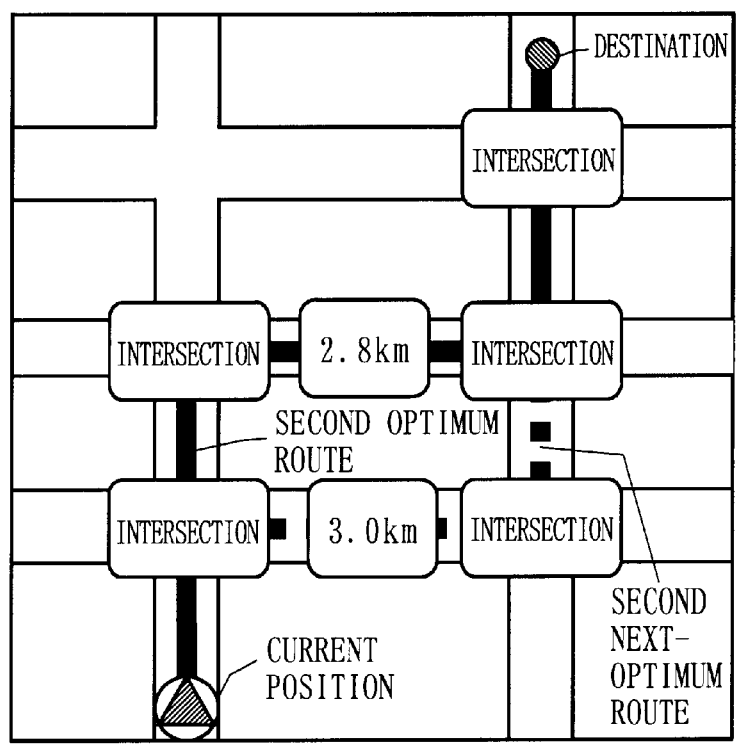

As shown in FIG. 30B, the warning data Drawn22' is image data which allows the display device 27 to display on the route diagram the distance to be covered by the user if he/she takes the second optimum route or the second next-optimum route. Here, image elements for indicating such a distance can be generated from the total cost Ctotal21 or Ctotal22. Alternatively, the distance may be displayed on the map or the enlarged map.

Figure 31A:
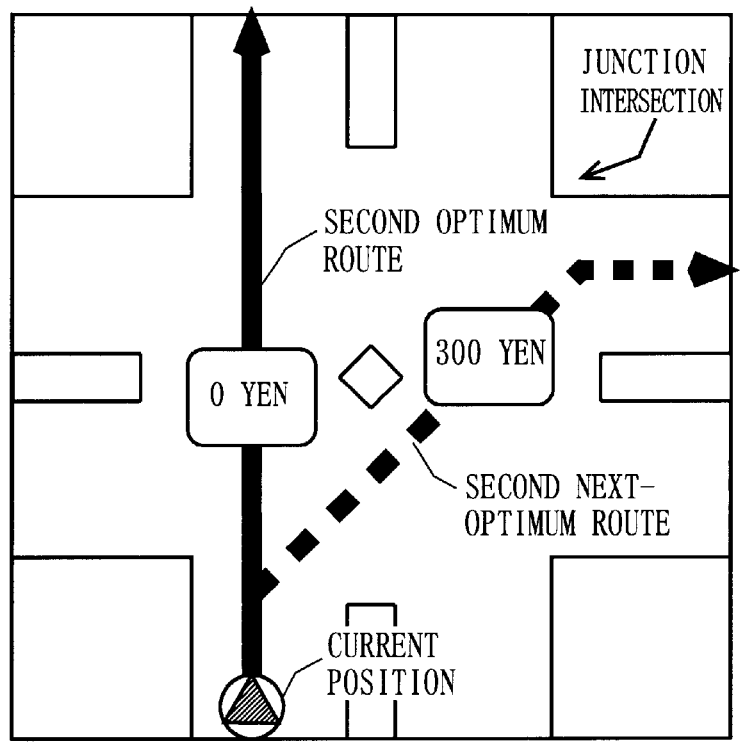
FIGS. 31A and 31B are diagrams showing warning data Dwarn23' and Dwarn24', respectively, which are generated by the CPU 21 of FIG. 19 and displayed on the screen of the display device 27.

As shown in FIG. 31A, the warning data Drawn23' is image data which allows the display device 27 to display on the enlarged map the toll for the user if he/she takes the second optimum route or the second next-optimum route. Here, image elements for indicating such a toll can be generated from toll fee information which is a part of the additional information Iaddi. Alternatively, the toll may be displayed on the map or the route diagram.

Figure 31B:
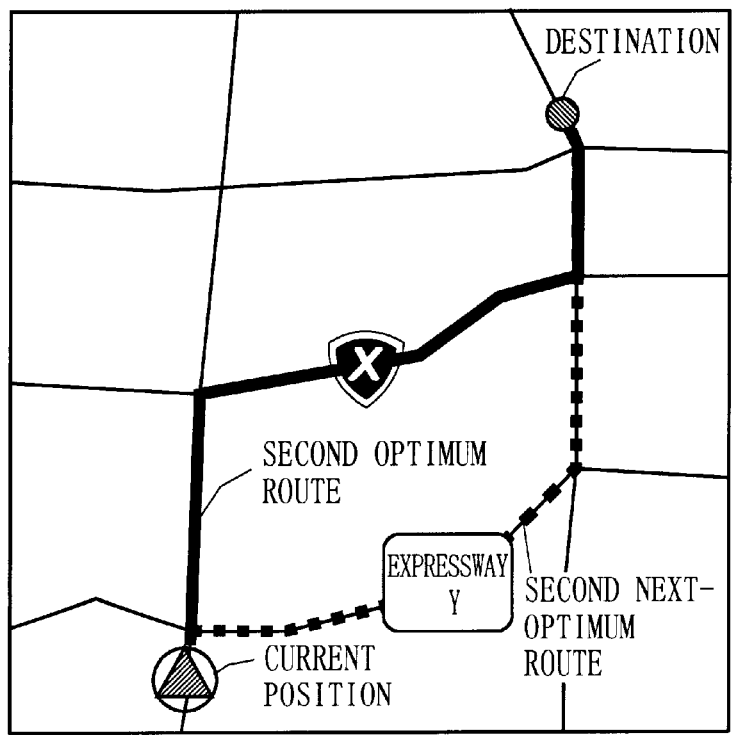

As shown in FIG. 31B, the warning data Drawn24' is image data which allows the display device 27 to display on the map the road attributes of the second optimum route or the second next-optimum route whichever the user takes. Here, the road attributes include road type, road name, road number, or the like. Image elements for indicating such road attributes can be generated from attribute information which is a part of the additional information Iaddi.

Alternatively, although not shown, warning data Dwarn25' and Dwarn26' may be generated to display the attributes of the second and the second next-optimum routes on the route diagram and the enlarged map.

In the above fourth embodiment, searched and found by the CPU 21 are two routes, i.e., second optimum and second next-optimum routes. This is not restrictive, and three or more of second routes will do.

Moreover, in the above, the route data Droute is presumably composed of a node string, but may be of a link string.

Further, the deciding factor for starting second route search is whether or not an instruction signal Sinst2 has been received before step S2008. This is not restrictive, and the deciding factor may be second and third conditions set for the purpose in the following fifth and sixth embodiments.

Described next is a navigation apparatus Anavi5 according to a fifth embodiment of the present invention. The basic hardware structure of the navigation apparatus Anavi5 is the same as that of the navigation apparatus Anavi4, and thus FIG. 19 is referred to.

However, there are some differences between the navigation apparatuses Anavi4 and Anavi5 as follows. First, in the navigation apparatus Anavi5, a part of the storage region of the RAM 23 is reserved for storing a setting flag Fset. The setting flag Fset is binary information which is criteria by which to judge whether second route search is to be performed. In the present embodiment, when the setting flag Fset indicates "1", it means that the second route search is to be preformed, but not with "0" indicated by the setting flag Fset.

Figure 32:
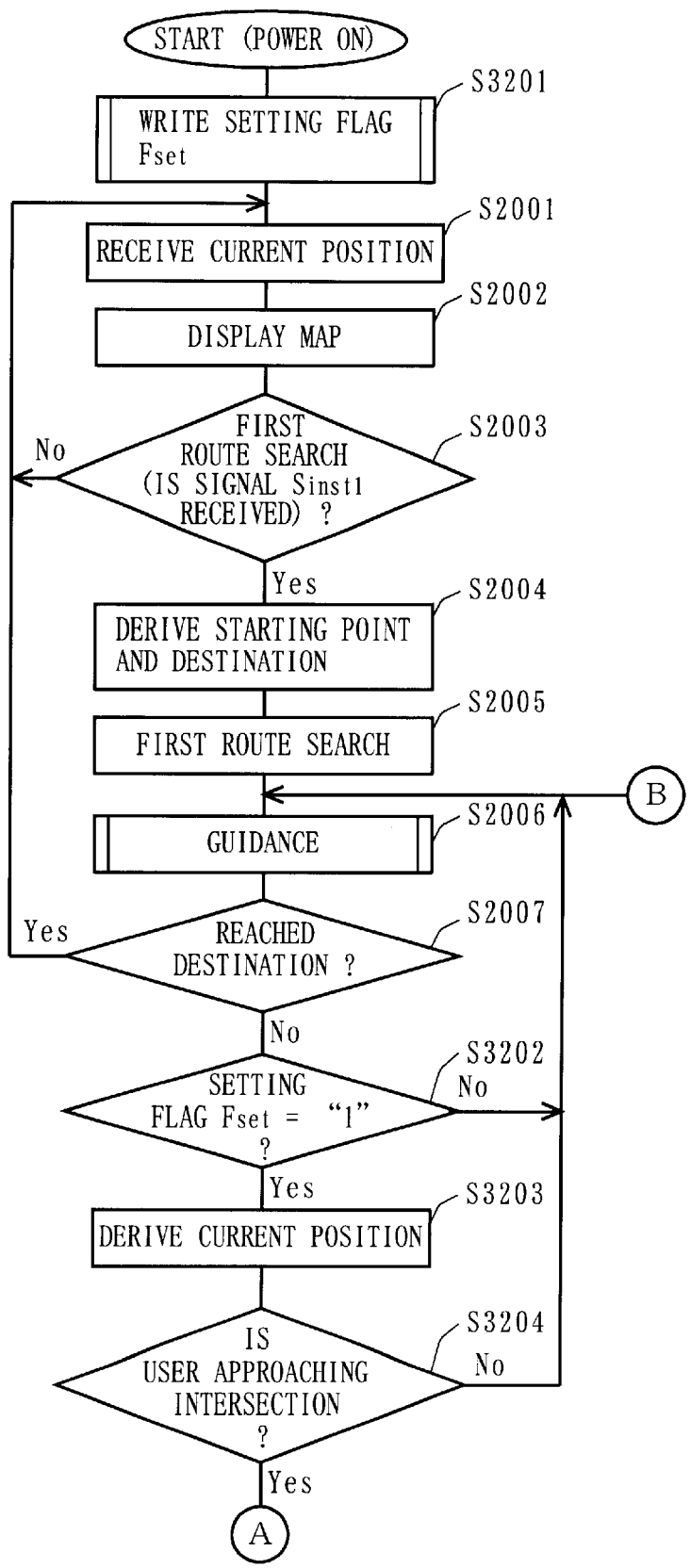
FIG. 32 illustrates the first half of a main flowchart showing the procedure of a CPU 21 of a fifth embodiment.

The operation of the navigation apparatus Anavi5 is now described. After the navigation apparatus Anavi5 is turned on, the CPU 21 starts executing the program Pnavi5. Here, FIG. 32 is a flowchart showing the first half of the procedure of the CPU 21 of the navigation apparatus Anavi5. Here, the second half of the procedure shows no difference from that in FIG. 21, and thus is not described.

Compared with FIG. 20, FIG. 32 newly includes step S3201, and steps S3202 and S3203 in place of step S2008. These are the only differences therebetween, and in FIG. 32, any step identical to that in FIG. 20 is provided with the same step number and is not described again.

Figure 33:
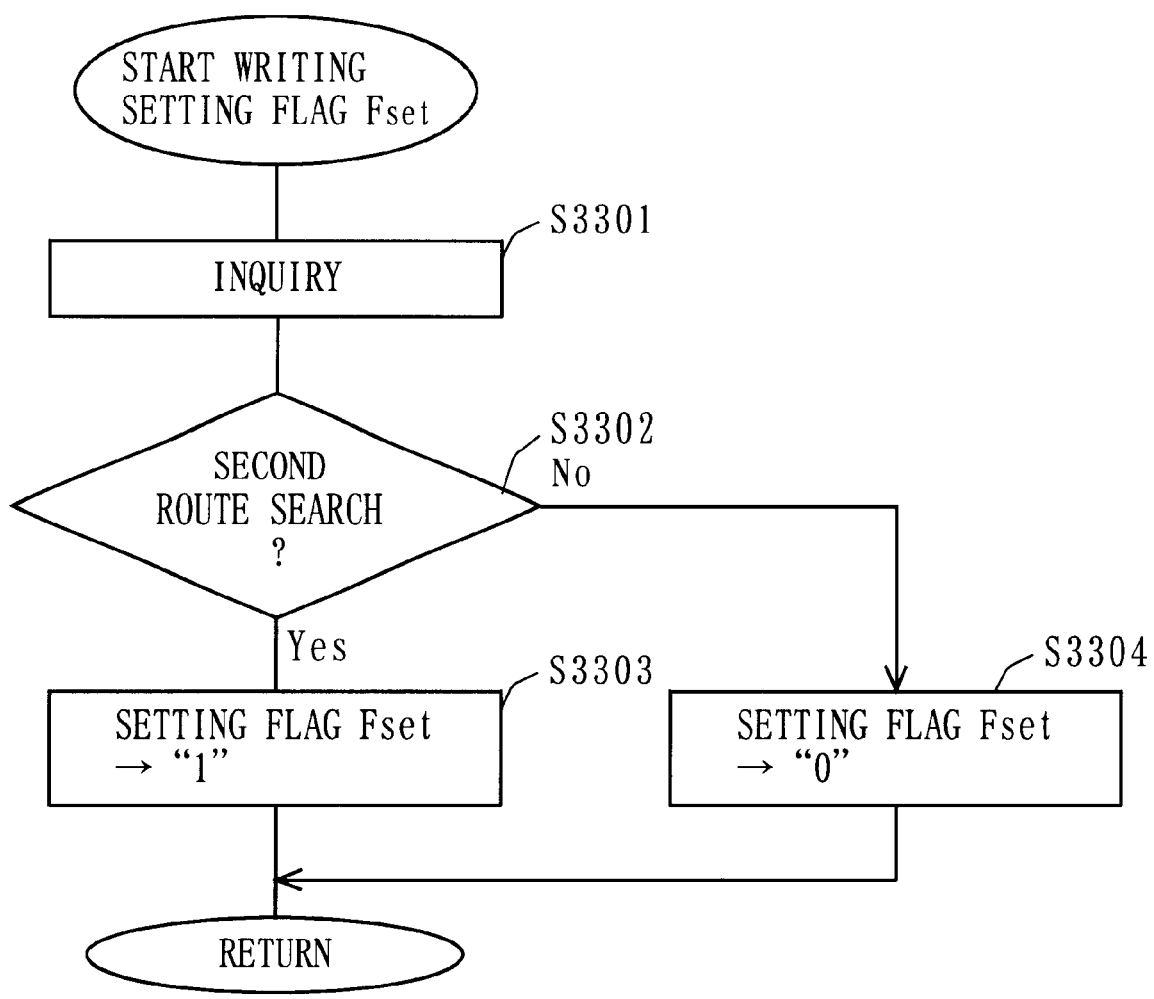
FIG. 33 is a flowchart showing the detailed procedure of a setting flag writing process (step S1401) of FIG. 32.

In FIG. 32, immediately after the navigation apparatus Anavi5 is turned on, the CPU 21 applies a process of writing a setting flag Fset (step S3201). Here, FIG. 33 is a flowchart showing the detail process of step S3201. In FIG. 33, the CPU 21 first generates message data Dmess1, and transfers it to the output section 26. Here, the message data Dmess1 is image data or sound data, with which the user is asked a question whether or not to perform the second route search during when he/she is driving.

Figure 34A:
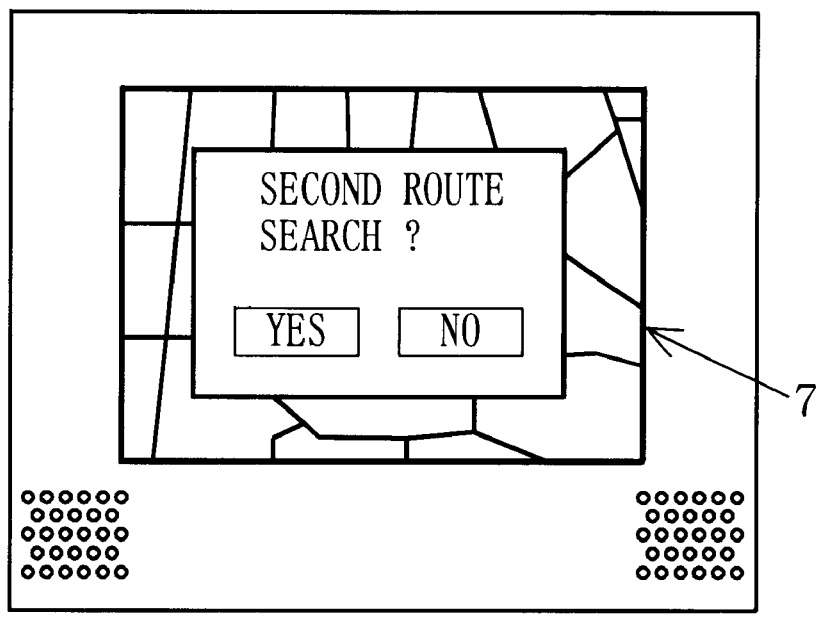
FIGS. 34A and 34B are diagrams each showing an exemplary screen of the display device 27 displaying message data Dmess1 outputted in an inquiry process (step S1501) of FIG. 33.
Figure 34B:
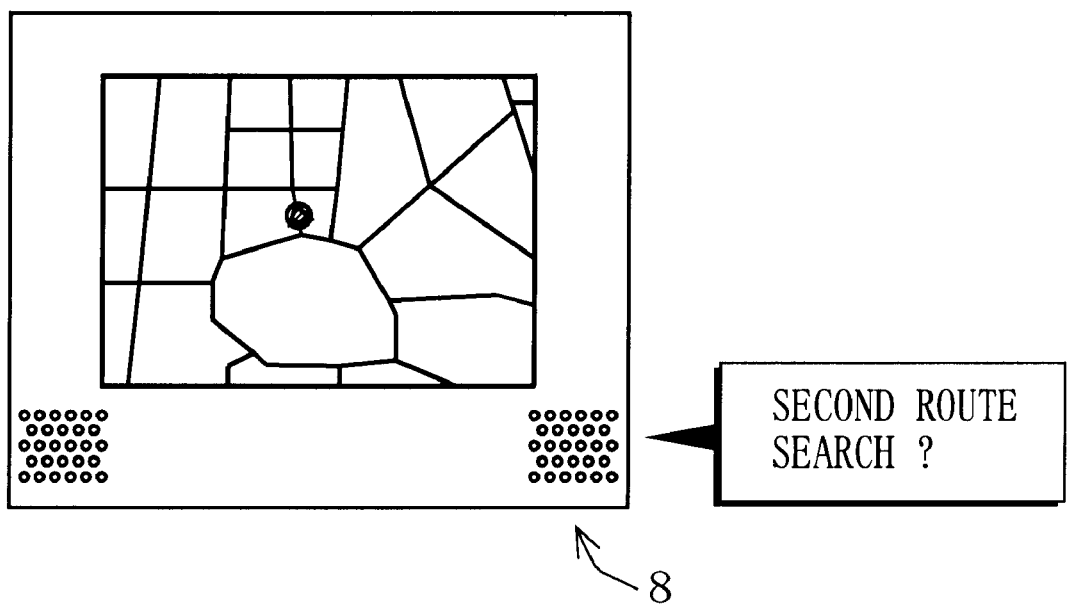

In accordance with the received message data Dmess1, the output section 26 goes through the display process or the sound output process. More specifically, the display device 27 displays on its screen such an image as shown in FIG. 34A based on message data Dmess2 which is image data. Also, the speaker 28 outputs such a sound as shown in FIG. 34B to the user based on the message data Dmess1 which is sound data. In this manner, the CPU 21 asks the user a question whether or not to perform the second route search (step S3301).

In response to the inquiry from the CPU 21, the user makes an input via the input device 25. Here, the user may manually operate the input device 25 via keys and mouse provided thereon, or speak into the microphone provided to the input device 25. In response to the user input, the input device 25 generates response information Irep to designate yes or no about performing second route search, and transfers it to the CPU 21.

The CPU 21 then decodes the received response information Irep so as to determine whether or not to perform the second route search (step S3302). If determined yes, the CPU 21 writes a value "1" as the setting flag Fset into the reserved region of the RAM 23 (step S3303). On the other hand, if determined no, writing into the reserved region of the RAM 23 is a value "0" (step S3304).

After step S3303 or S3304 is through, the procedure goes to step S2001. The reason to perform step S3201 immediately after the navigation apparatus Anavi5 is turned on is for safety. It is the time when the user does not yet start his/her vehicle, and thus there considered no harm if the user operates the input device 25.

After step S3201 is through, the procedure goes through steps S2001 to S2007, which are already described. Here, in step S2007, if the CPU 21 determines that the user does not yet reach the destination, the procedure goes to step S3202. Then, the CPU 21 determines whether the setting flag Fset is indicating "1" (step S3202). In the case that the setting flag Fset is indicating "0", it means that the user is not requesting the second route search, and thus the procedure returns to step S2006 so that the user is guided along the first optimum route.

On the other hand, if the setting flag Fset is determined as indicating "1" in step S3202, the CPU 21 receives the position information Icp from the locator 29 (step S3203).

The CPU 21 then determines whether the second starting condition is satisfied, that is, whether the user's current position is approaching any intersection located on the first route (step S3204). More specifically, in step S3204, in comparison among the coordinates indicated by the position information Icp and those of the nodes configuring the first route data Droute1, the CPU 21 calculates distances between the current position and the respective intersections. The calculated value is then compared with the predetermined threshold value Vth2.

In step S3204, if determined that the user is approaching no intersection, the procedure returns to step S2006 so that the user is guided along the first optimum route.

If determined that the user is approaching any of the intersections, the procedure goes to step S2009 of FIG. 21, i.e., circled letter A of FIG. 32. The processes hereafter are the same as those in the fourth embodiment, and thus no further description is given.

As described above, depending on the result derived in step S3204 as the second starting condition, the navigation apparatus Anavi5 can start searching for second routes while it is guiding the user along the first optimum route. Accordingly, with the navigation apparatus Anavi5, the user has no more need to go off the first optimum route to know what other route options, i.e., second routes, are available. Further, since the second route is plurally found in step S2010, a wider range of route choices can be offered to the user to select therefrom whatever detour route meeting his/her preferences or actual traffic conditions.

In the fifth embodiment, the user is asked a question in step S3201 whether or not to perform second route search before starting driving. Otherwise, the navigation apparatus Anavi5 may start searching for the second routes every time the user comes closer to any of the intersections on the first route. In order not to annoy the user as such, step S3201 is carried out.

Described next is a navigation apparatus Anavi6 according to a sixth embodiment of the present invention. The basic hardware structure of the navigation apparatus Anavi6 is the same as that of the navigation apparatus Anavi4, and thus FIG. 19 is referred to.

Figure 35:
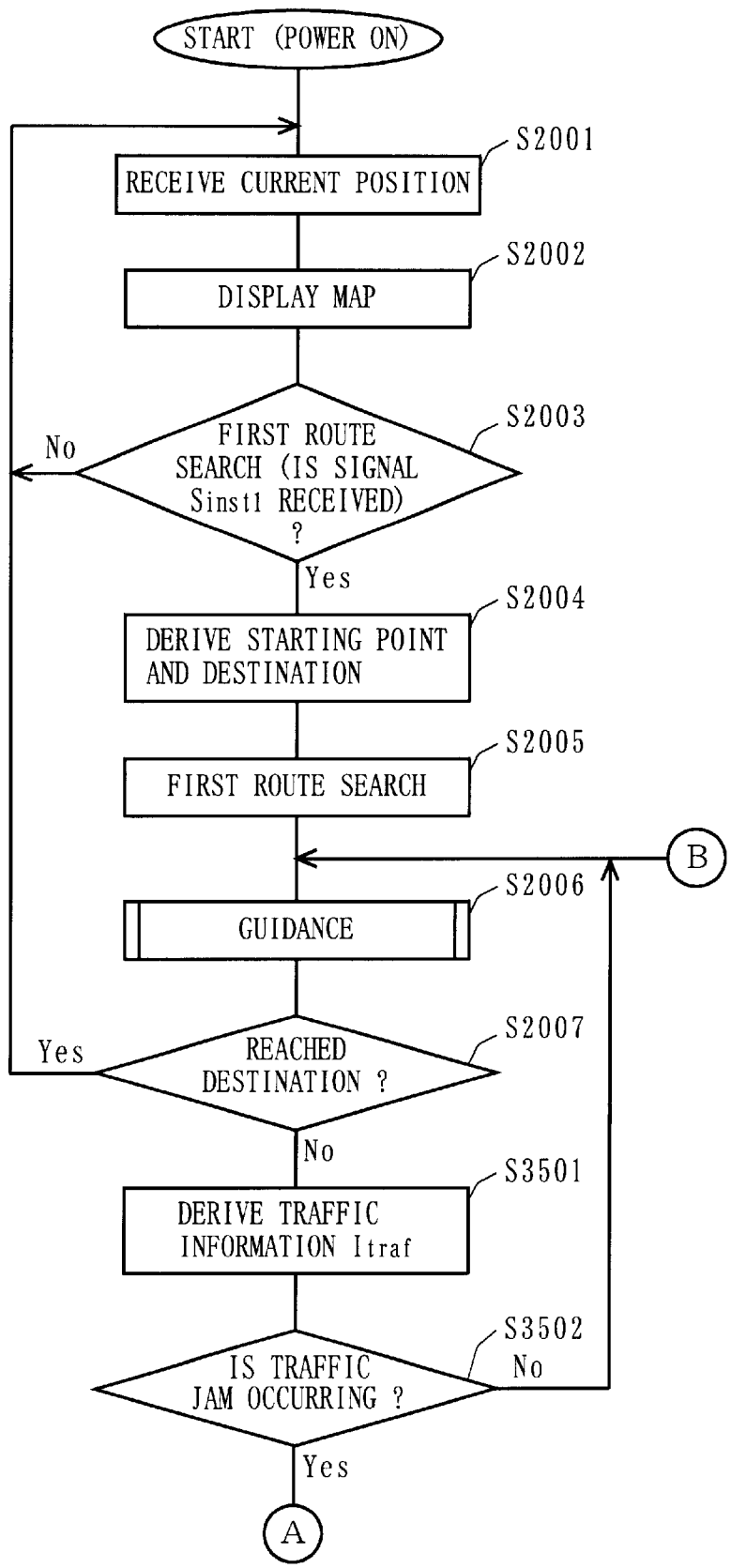
FIG. 35 illustrates the first half of a main flowchart showing the procedure of a CPU 21 of a sixth embodiment.

Described next is the operation of the navigation apparatus Anavi6. After the navigation apparatus Anavi6 is turned on, the CPU 21 starts executing the program Pnavi6. Here, FIG. 35 is a main flowchart showing the first half of the procedure of the CPU 21 of the navigation apparatus Anavi6. Here, the second half of the procedure shows no difference from that in FIG. 21, and thus is not described.

Compared with FIG. 20, FIG. 35 includes steps S3501 and S3502 in place of step S2008. This is the only difference therebetween, and in FIG. 35, any step identical to that in FIG. 20 is provided with the same step number and is not described again.

In FIG. 35, immediately after the navigation apparatus Anavi6 is turned on, the procedure goes through steps S2001 to S2007. In step S2007, if the CPU 21 determines that the user does not yet reach the destination, the procedure goes to step S3501. Then, the CPU 21 receives traffic information Itraf from beacons located in the proximity of roads via the communications device 210 (step S3501). As described above, the traffic information Itraf specifies, by coordinates, the locations where the traffic accidents or jams are occurring.

In accordance with the traffic information Itraf and the first route data Droute1, the CPU 21 determines whether any traffic jam or accident is occurring on the first optimum route (step S3502). More specifically, the CPU 21 determines if the coordinates indicated by the traffic information Itraf coincide any of those of nodes configuring the first route data Droute1.

If determination result tells that no coincidence is found, the CPU 21 determines that there is no traffic jam or accident occurring on the first routes. The procedure then returns to step S2006 so that the user is guided along the first optimum route.

On the other hand, if determination result tells that there found some coincidence, the CPU 21 determines that there is a traffic jam or accident occurring on the first route. The procedure then goes to step S2009 of FIG. 21, i.e., circled letter A of FIG. 35. The processes hereafter are the same as those in the fourth embodiment, and thus no further description is given. Here, the second and next-optimum routes searched in step S2010 should sufficiently avoid the traffic jam or accident currently occurring.

As described above, in the sixth embodiment, depending on the result derived in step S3502 as the third starting condition, the navigation apparatus Anavi6 can start searching for second routes while it is guiding the user along the first optimum route. Accordingly, with the navigation apparatus Anavi6, the user has no more need to go off the first optimum route to know what other route options, i.e., second routes, are available. Further, since the second route is plurally found in step S2010, a wider range of route choices can be offered to the user to select therefrom whatever detour route meeting his/her preferences or actual traffic conditions.

In the fourth to sixth embodiments, the navigation apparatuses Anavi are presumably of a vehicle-mounting type as those include sensors such as a vehicle speed sensor or a VICS receiver. This is not restrictive, and the navigation apparatuses Anavi are easily realized in the portable application. Moreover, the navigation apparatuses Anavi can be easily implemented in computer devices such as mobile phones, Personal Digital Assistants (PDAs), and personal computers.

The programs Pnavi4 to Pnavi6 described in the above fourth to sixth embodiments may be distributed in recording media typified by CDs, DVDs (Digital Versatile Disks), MO (Magnetic-Optical) disks, or semiconductor memories. Also, the programs Pnavi4 to Pnavi6 may be stored on the storage device of a network server so that the computer devices can download those programs therefrom.

While the invention has been described in detail, the foregoing description is in all aspects illustrative and not restrictive. It is understood that numerous other modifications and variations can be devised without departing from the scope of the invention.

What is claimed is:

1. A navigation apparatus for guiding a user to a destination by using cartographic data, said navigation apparatus comprising:

a route search section being operable to search for a first route from a departure point toward the destination by using the cartographic data;

a guidance data generation section being operable to generate guidance data for guiding the user toward the destination based on the first route found by said route search section and the cartographic data;

an output section being operable to output the guidance data generated by said guidance data generation section, wherein said route search section further searches for a plurality of second routes from a current position of the user toward the destination when a predetermined starting condition is satisfied when the guidance data is being outputted; and a warning data generation section being operable to generate warning data for notifying the user of the plurality of second routes found by said route search section, wherein said output section further outputs the warning data generated by said warning data generation section, and the plurality of second routes are varying in course on the way from the current position of the user to the same destination as the first route, and are different from the first route.

2. The navigation apparatus according to claim 1, wherein said warning data generation section generates on a map represented by the cartographic data, image data which enables the plurality of second routes to be displayed as the warning data.

3. The navigation apparatus according to claim 2, wherein, when the user approaches a junction intersection where the plurality of second routes are branched, said warning data generation section further generates image data representing an enlarged view of an area around the junction intersection as the warning data.

4. The navigation apparatus according to claim 1, wherein said warning data generation section generates, as the warning data, image data representing a route diagram in which a plurality of intersection names are connected for each of the plurality of second routes.

5. The navigation apparatus according to claim 4, wherein, when the user approaches a junction intersection where the plurality of second routes are divided, said warning data generation section generates, as the warning data, image data representing an enlarged view of an area around the junction intersection.

6. The navigation apparatus according to claim 1, wherein said warning data generation section generates, as the warning data, image data which enables the user to distinguish which of the plurality of second routes is an optimum route.

7. The navigation apparatus according to claim 1, wherein said warning data generation section generates warning data for notifying the user of a time taken for the user to reach the destination for each of the plurality of second routes found by said route search section.

8. The navigation apparatus according to claim 1, wherein said warning data generation section generates warning data for notifying the user of a distance to the destination for each of the plurality of second routes found by said route search section.

9. The navigation apparatus according to claim 1, wherein said warning data generation section generates warning data for notifying the user of a toll cost for the user to reach the destination for each of the plurality of second routes found by said route search section.

10. The navigation apparatus according to claim 1, wherein said warning data generation section generates warning data for notifying the user of an attribute of roads configuring each of the plurality of second routes found by said route search section.

11. The navigation apparatus according to claim 1, further comprising an input device being operable to generate an instruction signal in response to an operation of the user, and transfer the instruction signal to said route search section, wherein said route search section starts searching for the plurality of second routes in response to the instruction signal as the starting condition.

12. The navigation apparatus according to claim 1, further comprising:

a locator being operable to detect the current position of the user, and a determination section being operable to determine whether the user is approaching an intersection by using the plurality of second routes found by said route search section, and the current position of the user detected by said locator, wherein said route search section starts searching for the plurality of second routes in response to a determination result of said determination section as the starting condition.

13. The navigation apparatus according to claim 1, further comprising:

a reception section being operable to receive traffic information for specifying a location where a traffic jam or a traffic accident is occurring; and a determination section being operable to determine whether or not any traffic jam or traffic accident is occurring on the first route based on the traffic information received by said reception section, wherein said route search section starts searching for the plurality of second routes in response to a determination result of said determination section as the starting condition.

14. A navigation method for guiding a user to a destination by using cartographic data which is previously stored, said navigation method comprising:

searching for a first route from a departure point toward the destination by using the cartographic data;

generating guidance data for guiding the user toward the destination based on the first route found in said searching for the first route operation and the cartographic data;

outputting the guidance data generated in said generating of the guidance data operation;

searching for a plurality of second routes from a current position of the user toward the destination when a predetermined starting condition is satisfied when the guidance data is being outputted;

generating warning data for notifying the user of the plurality of second routes found in said searching for the plurality of second routes operation; and outputting the warning data generated in said generating of the warning data operation, wherein the plurality of second routes vary in course from the current position of the user to the same destination as the first route, and are different from the first route.

15. The navigation method according to claim 14, further comprising receiving an instruction signal generated in response to an operation of the user, wherein said searching for the plurality of second routes operation starts searching for the plurality of second routes in response to the instruction signal received in said receiving of the instruction signal operation as the starting condition.

16. The navigation method according to claim 14, further comprising:

receiving the current position of the user, and determining whether or not the user is approaching an intersection by using the first route derived in said searching for the first route operation, and the current position received in said receiving of the current position operation, wherein said searching for the plurality of second routes operation starts searching for the plurality of second routes in response to a result determined in said determining operation as the starting condition.

17. The navigation method according to claim 14, further comprising:

receiving traffic information for specifying a location where a traffic jam or a traffic accident is occurring; and determining a traffic condition on the first route based on the traffic information received in said receiving of the traffic information operation, wherein said searching for the plurality of second routes operation starts searching for the plurality of second routes in response to a result determined in said determining of the traffic condition operation as the starting condition.

18. A computer program embodied on a computer readable medium for use with a computer for realizing navigation for guiding a user to a destination by using cartographic data which is previously stored, said computer program comprising:

first route search computer readable program code being operable to search for a first route from a departure point toward the destination by using the cartographic data;

guidance data generation computer readable program code being operable to generate guidance data for guiding the user toward the destination based on the first route found by said route search computer readable program code and the cartographic data;

guidance data output computer readable program code being operable to output the guidance data generated by said guidance data generation computer readable program code;

second route search computer readable program code being operable to search for a plurality of second routes from a current position of the user toward the destination when a predetermined starting condition is satisfied when the guidance data is being outputted;

warning data generation computer readable program code being operable to generate warning data for notifying the user of the plurality of second routes found by said second route search computer readable program code; and warning data output computer readable program code being operable to output the warning data generated by said warning data generation computer readable program code, wherein the plurality of second routes are varying in course from the current position of the user to the same destination as the first route, and are different from the first route.

19. The computer program according to claim 18, further comprising reception computer readable program code being operable to receive an instruction signal generated in response to an operation of the user, wherein said second route search computer readable program code starts searching for the plurality of second routes in response to the instruction signal received by said reception computer readable program code as the starting condition.

20. The computer program according to claim 18, further comprising:

reception computer readable program code being operable to receive the current position of the user, and determination computer readable program code being operable to determine whether or not the user is approaching an intersection by using the first route derived by said first route search computer readable program code, and the current position received by said reception computer readable program code, wherein said second route search computer readable program code starts searching for the plurality of second routes in response to a result determined by said determination computer readable program code as the starting condition.

21. The program according to claim 18, further comprising:

reception computer readable program code being operable to receive traffic information for specifying a location where a traffic jam or a traffic accident is occurring; and determination computer readable program code being operable to determine a traffic condition on the first route based on the traffic information received by said reception computer readable program code, wherein said second route search computer readable program code starts searching for the plurality of second routes in response to a result determined by said determination computer readable program code as the starting condition.

\* \* \* \* \*

UNITED STATES PATENT AND TRADEMARK OFFICE
CERTIFICATE OF CORRECTION

PATENT NO.      : 6,466,869 B2
DATED           : October 15, 2002
INVENTOR(S)     : Atsushi Yamashita et al.

It is certified that error appears in the above-identified patent and that said Letters Patent is hereby corrected as shown below:

<u>Title page,</u>
Item [57], ABSTRACT,
Line 1, delete "Anavil" and "1".
Line 3, change "route" to -- routes --.
Line 4, insert -- their -- before "course".
Line 6, delete "9"; change "route" to -- of the routes --.
Line 8, delete "others".

Signed and Sealed this

Eleventh Day of March, 2003

JAMES E. ROGAN
*Director of the United States Patent and Trademark Office*